(12) United States Patent  
Smith et al.

(10) Patent No.: US 7,519,522 B2  
(45) Date of Patent: Apr. 14, 2009

(54) SYSTEM AND METHOD FOR MORPHABLE MODEL DESIGN SPACE DEFINITION

(75) Inventors: Randall C. Smith, Rochester Hills, MI (US); Richard R. Pawlicki, Sterling Heights, MI (US); David Robert Warn, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 266 days.

(21) Appl. No.: 11/185,929

(22) Filed: Jul. 20, 2005

(65) Prior Publication Data

US 2006/0038832 A1 Feb. 23, 2006

Related U.S. Application Data

(60) Provisional application No. 60/598,290, filed on Aug. 3, 2004.

(51) Int. Cl.  
*G06F 17/50* (2006.01)  
*G06G 7/48* (2006.01)

(52) U.S. Cl. .............................. 703/8; 703/1

(58) Field of Classification Search .................. 703/1, 703/8; 345/630  
See application file for complete search history.

(56) References Cited

U.S. PATENT DOCUMENTS 6,113,644 A * 9/2000 Weber et al. .................. 703/8
6,310,627 B1 * 10/2001 Sakaguchi ................. 345/630
6,525,744 B1    2/2003 Poggio et al.
6,556,196 B1    4/2003 Blanz et al.
2002/0130857 A1 * 9/2002 Perry et al. ................. 345/420
2004/0010398 A1 * 1/2004 Noma et al. .................. 703/1
2005/0210421 A1 * 9/2005 Smith et al. ................... 716/1

FOREIGN PATENT DOCUMENTS

GB          2369467 A   *  5/2002

OTHER PUBLICATIONS

Gould, Lawrence. "What You See in Product Visualization Is What You Get." Automotive Design and Production. Apr. 1998 <http://www.autofieldguide.com/articles/049808.html>.*
Gould, Lawrence. What You See in Product Visualization Is What You Get. Automotive Design and Production. Apr. 1998.*

(Continued)

*Primary Examiner*—Hugh Jones

(57) ABSTRACT

A system, method, apparatus and product for designing, on a display device, a geometric shape is disclosed. The method comprises the steps of displaying an initial set of similarly structured model exemplars on a display device, selecting a chosen set of models from the initial set of similarly structured model exemplars to apply to a model mix, mixing the set of models consisting of a first portion and a second portion to form a currently displayed shape, providing on the display device at least one selectable feature for manipulating the currently displayed shape, and applying a constraint of the selectable feature to the displayed shape to update both the first portion and the second portion of the currently displayed shape into a new geometric shape design. In a particular implementation, the first portion of the geometric shape is an automobile and the second portion is a standardized human occupant representation.

19 Claims, 12 Drawing Sheets

OTHER PUBLICATIONS

V. Blanz et al., A Morphable Model for the Synthesis of 3D Faces, Proceedings Siggraph, 1999. pp. 1-8.

C. R. Shelton, Three-Dimensional Correspondence, A. I. Technical Report No. 1650, M.I.T. Artificial Intelligence Laboratory, 1998. pp. 1-54.

C. R. Shelton, Morphable Surface Models, International Journal of Computer Vision, 38(1), pp. 75-91, 2000.

Shenchang Eric Chen et al., Shape Averaging and its Applications to Industrial Design, IEEE Computer Graphics and Applications, vol. 9, Issue 1, pp. 47-54, Jan. 1989.

Brett Allen et al., The space of human body shapes: reconstruction and parameterization from range scans, ACM Transactions on Graphics, vol. 22, Issue 3, Proceedings of SIGGRAPH 2003, pp. 587-594, Aug. 2003.

* cited by examiner

Coupe

Truck

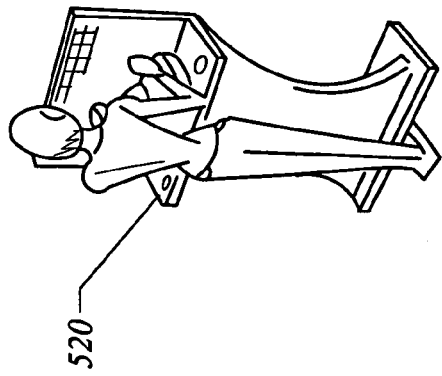
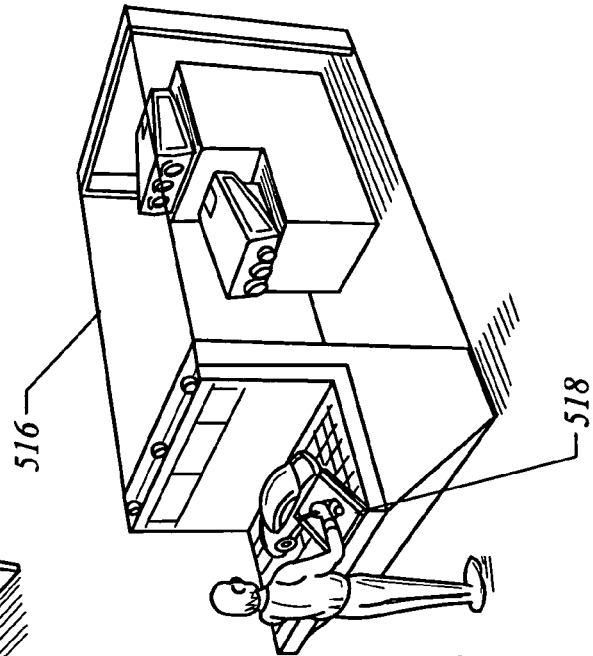
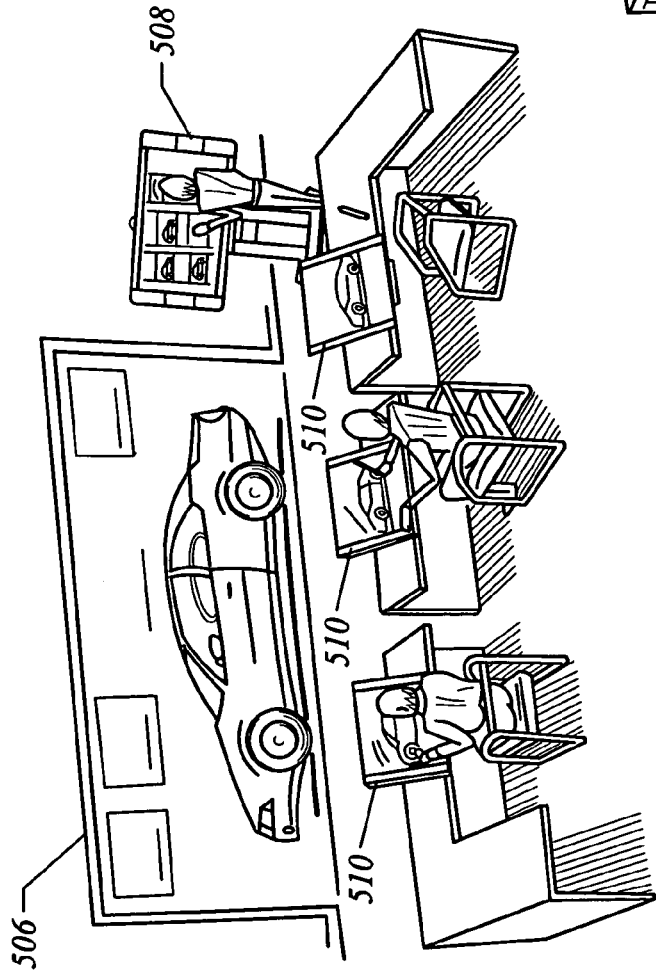
FIG. 19
FIG. 18
FIG. 16

US 7,519,522 B2

SYSTEM AND METHOD FOR MORPHABLE MODEL DESIGN SPACE DEFINITION

CROSS REFERENCE TO RELATED APPLICATIONS

This application claims priority to U.S. Provisional Application Ser. No. 60/598,290, titled, "SYSTEM AND METHOD FOR GEOMETRIC SHAPE DESIGN," filed Aug. 3, 2004, and is related to U.S. Provisional Application Ser. No. 60/552,975, titled, "CAPTURING AND MANIPULATING AUTOMOTIVE DESIGN CHARACTERISTICS IN A STATISTICAL SHAPE MODEL," filed Mar. 12, 2004, both of which are incorporated by reference herein in their entirety.

TECHNICAL FIELD

A design tool for use in manufacture is disclosed. More particularly, this disclosure relates to computer-aided geometric shape design tools.

BACKGROUND OF THE INVENTION

Computer design tools useful for industrial design are most commonly "computer aided design" (CAD) based. Users of CAD programs often undergo training and have much experience in the use of CAD before their proficiency reaches a level high enough for complex design and engineering.

In the automotive industry, car body designers typically sketch their designs. Car body designers are creative artists who produce styling sketches and typically do not use CAD programs. From sketches and discussion with the car body designer, a CAD designer will rework the sketch onto the computer. Accordingly, the sketch is engineered into three-dimensional detail. There are often many instances of refinement discussed between the artist and CAD user. Oftentimes, for example, the designer's sketches are not in correct perspective and details may need to be added and changed, and therefore, the process to completion by a CAD user may become tedious and repetitive. The CAD tool requires construction of a shape, piece by piece. The overall shape may not emerge until a significant amount of work has been done.

It would be advantageous for a designer to have available a design tool that is simple to operate and can readily replace hand sketching, and whose resultant design is captured in a computer file. Therefore, the time consuming step of refinement between the artist and a CAD designer may be substantially eliminated.

In design, a designer most likely must keep the design within certain criteria and style parameters. Vehicle design process typically begins with vehicle criteria. Some of such criteria include vehicle dimensions, proportions, and points called "hard points" which in certain circumstances should not be changed. Hard points may be categorized according to vehicle architecture class, for example. A resulting set of dimensions for hard points is therefore developed and communicated to a designer. The designer may then design the vehicle exterior and interior with constraints given on the location of at least some of the vehicle hard points.

Criteria including hard points may include details of occupant positioning. An occupant is represented by an automotive-standard sized human figure, hereinafter called the "Oscar" or mannequin. Heel point, eye ellipse and the seating reference point (H-point) are all determined by the position and the pose of a standardized human representation.

SUMMARY OF THE INVENTION

This invention is a software package, a system, a method, and an apparatus for designing geometric shapes for automobiles or any other manufactured objects. Accordingly, a CAD user may input the model generated by the described design tool and begin the process of model making therefrom or use the model directly.

BRIEF DESCRIPTION OF THE DRAWINGS

FIG. 16 is an illustration showing several user interfaces;

FIG. 18 is an illustration showing an additional display and interface; and

FIG. 19 is an illustration showing another user interface.

DESCRIPTION OF THE PREFERRED EMBODIMENT

Figure 1:
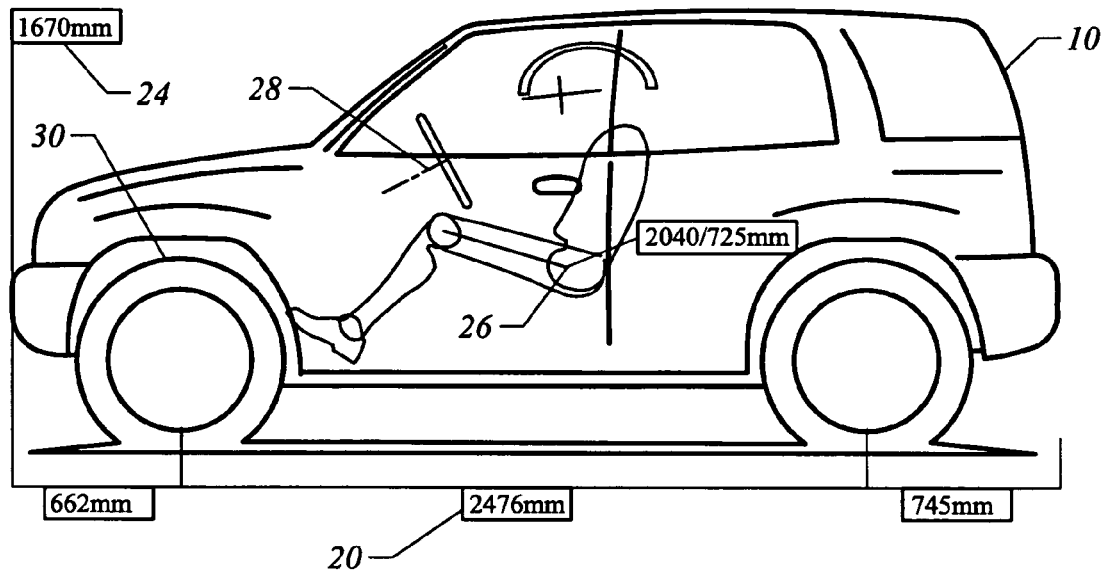
FIG. 1 is an illustration of certain criteria including dimensions, proportions, and hard point elements of a vehicle.

A design tool that provides options for morphing features, such as occupant position within a vehicle, gives a designer the ability to change a design by changing a feature. Positioning a human representation within a vehicle representation on a display and then morphing a vehicle design by changing the occupant's position would allow a designer to view a changing vehicle design as the occupant position changes. A design tool including morphing capabilities provides flexibility to allow a designer to explore different results.

On a display screen a first set of exemplar designs—hereinafter referred to as a catalog—is provided for selecting a second set of exemplars to create a resultant design space or mixture. The catalog of vehicle exemplars may include a model of an occupant positioned within each vehicle. When the vehicles are mixed, the occupants are mixed as well.

A design space includes space defined by features of a mixture. Once a user has created a resultant combined design, also available is the ability for the designer to explore the design space and therefore to change or morph the resultant design. Automobile designs may be embodied as the exemplars. In addition to the vehicle shape geometry, the representation may contain additional parts, like the mannequin, or lengths and proportions associated with the shape. These can be used in controlling the shape to meet given design criteria.

These parts can be considered part of the exemplar. The term exemplar includes a model that is a registered model as described in detail below.

Once the resultant combined design is chosen then manipulated, altered, or morphed according to the statistical model, the result may be a new design. The mathematical space and statistical manipulations of the mathematical space allow the user to explore the space allowing for stylistic and functional interpretations. A mathematical algorithm described herein allows the user to select one or more feature constraints and apply the constraints to the morphable model The technology described herein may be embodied in the form of any number of computer-implemented processes and apparatuses for practicing those processes. Embodiments may be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

A system, method and apparatus for controlling the shape of a 2D or 3D statistically morphable model by changing a position or arrangement of an occupant or any other criteria are described herein. Prior to development of vehicle aesthetics, a stylist utilizes functional requirements for the shape being designed. Initial specifications are provided in the form of overall proportions, vehicle class, and general occupant positioning. If a vehicle is being re-skinned, then small changes are being made to it and the existing vehicle is used as a reference. With new concept vehicles, there is generally no simple, existing reference.

Packaging and criteria information are available to assist in providing information early in the design process. Existing vehicles used as input to a statistical model already have well-coordinated packaging and aesthetic characteristics. FIG. 1 shows a vehicle profile and packaging information for an input vehicle 10. The example shows a few of the primary criteria including wheelbase 20, vehicle height 24 and the occupant H-point 26. Other values including steering wheel position 28 and wheel diameter 30 may be included as well.

In one embodiment, a statistical computer model, also referred to as a morphable model, is generated in accordance with the algorithm described in detail below. In that case, a statistical model is formed by combining exemplars from a catalog of exemplars composed of related curve segments, and mathematically operating on them to form a statistical model. As will be described herein, an occupant's representation is positioned within a morphable model. Changing the occupant's position will cause the morphable computer model to change.

Figure 2:
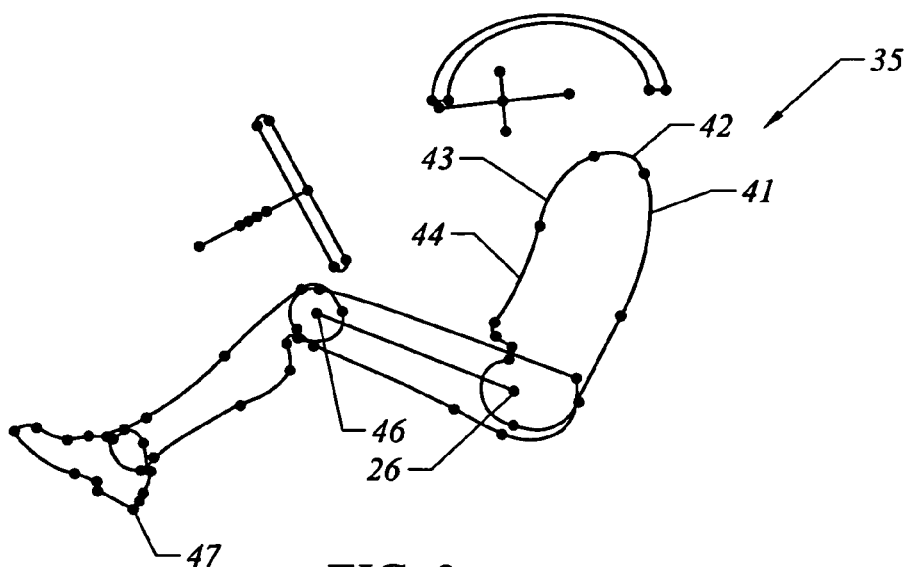
FIG. 2 is a diagram of an automotive-standard sized human representation or mannequin including segments and points.

FIG. 2 shows curve segments of mannequin 35 and associated interior points, for example, the back, shoulder, and chest segment curves 40, 41, 42, 43 and 44, and points of a mannequin, the H-point 26, the knee point 46, and the heel point 47 representing a vehicle occupant in the driving position. Curve segments and points can be of any length or position that is suitable to the designer and suits the criteria. In this case, the mannequin dimensions are fixed by an automotive standard. Once imposed within a vehicle 10 prior to a mix the mannequin curve segments are correlated to the vehicle curve segments. Any repositioning of the mannequin or morphing of the vehicle will likewise have an impact on the other.

The curves and points may be moved by user input. The result of the segmentation of the curves of the occupant and the curves of the vehicle model is a set of features that can be put into 1-to-1 correspondence across all input vehicles having occupants. From these vehicles and occupants in correspondence, a statistical model can be produced that captures the similarities in character, style, shape and proportions of the set. All curves are now related to each other from the examples defining the design space, and they change consistently together. Manipulating the exterior will change the packaging curves and the occupant's position, and visa versa. This dynamic interaction of styling and packaging is available immediately to the stylist to aid the aesthetic creation process.

The design tool therefore provides the ability to morph models in many ways. Basic geometric shape features such as points can be constrained to lie in certain positions. Other features that are selectable for constraint during morphing may include primary criteria such as vehicle height, wheelbase, H-point, and steering wheel position. A feature may include a simple attribute of the reference model, for example, a point.

The mannequin's features can be appended to the features describing each vehicle exemplar in the same way. The resulting total list of features describes both the vehicle and mannequin together. When a morphable model is created from these exemplars, both the vehicle and the mannequin are related and change together.

Figure 3:
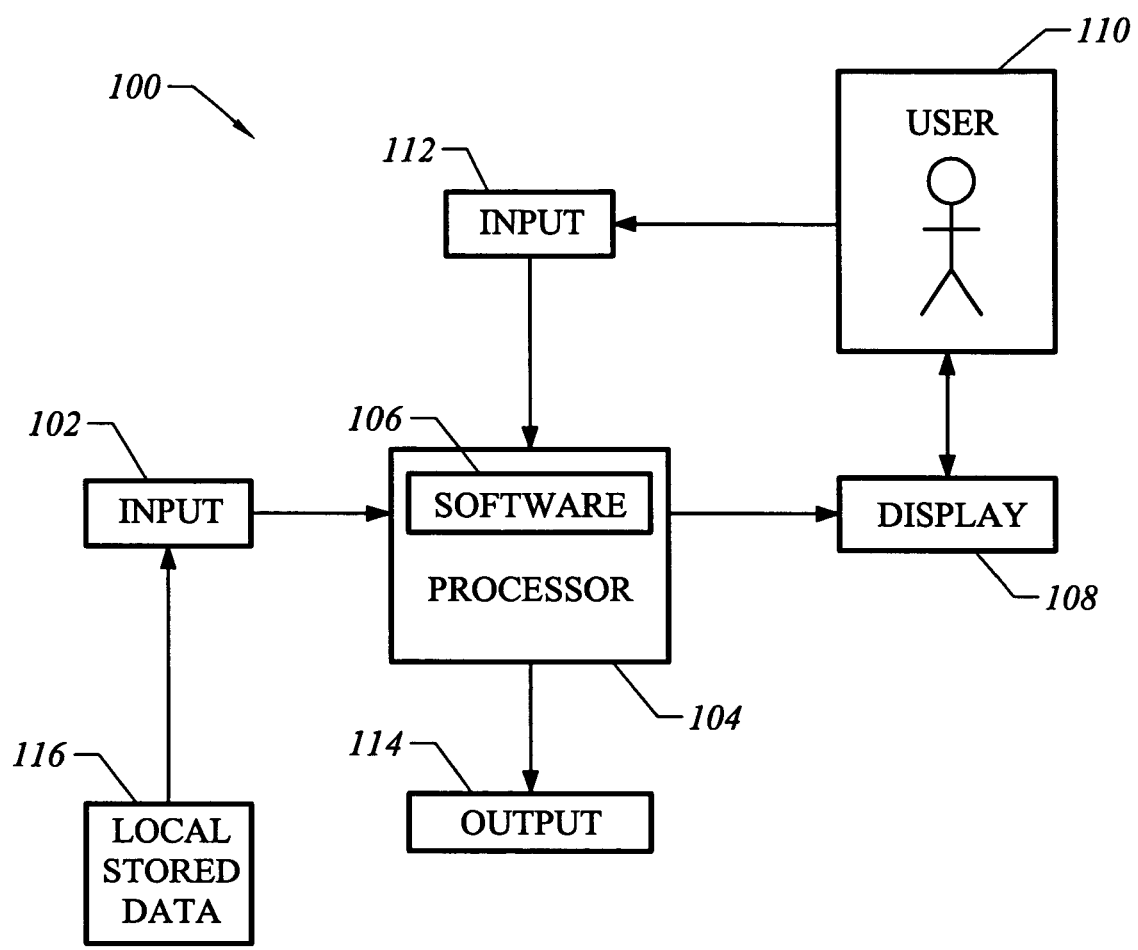
FIG. 3 is a system and apparatus diagram.
Figure 4:
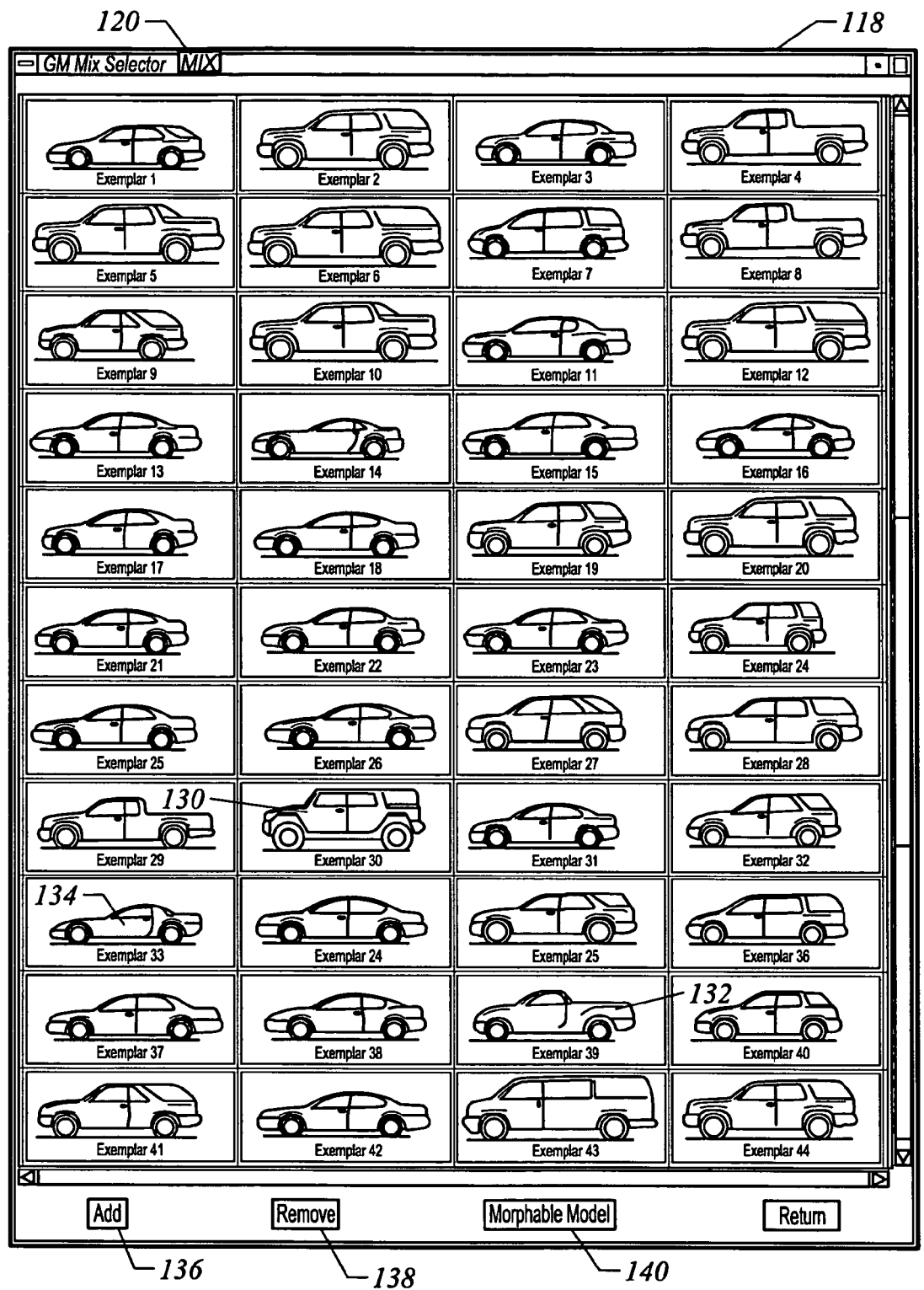
FIG. 4 is a screen display showing a catalog.

Turning to FIG. 3, the user 110 may view on display screen 108 a variety of models shown in catalog form 118 (see FIG. 4). To form a statistical model, the user may begin the method by selecting a mix, or set of designs, from the catalog, to define and populate a mathematical design space. A model as referred to herein includes a single geometric object(s). A reference model includes a template for a class of objects, for example of vehicles. A catalog includes a collection of exemplars from one object class. The terms "vehicle" and "object" are used interchangeably in this disclosure and, where vehicle is used, object applies.

Exemplars that correspond to existing models may inherently incorporate engineering constraints. The term constraint used in this disclosure is a mathematical term and used in the sense of a mathematical operation, and is not intended to add limitations to the meaning of the features with which it is used in conjunction. Packaging and criteria information exists in the data stored in datastore 116 or elsewhere of the cataloged vehicles providing information early in the design process. Existing vehicles used as input to the statistical model may already have well-coordinated packaging and aesthetic characteristics. The hard points, other criteria and packaging details are constraints that restrain the mannequin's position within the vehicle. Moving the mannequin is a way of exploring alternative packaging criteria.

As briefly mentioned above, the catalog provides the designer exemplars to incorporate into a resultant object that may meet target design requirements. Accordingly, certain criteria including engineering constraints may be built into the resultant average vehicle as exemplars are existing models and inherently include engineering constraints. Many engineering criteria are manipulable, changeable or morphable in accordance with this process, method and apparatus. Engineering constraints available for application in the morphing process may be displayed as, for example, options in drop down menus.

There may be a style that the designer may want to emulate, e.g., a BUICK—having a particular brand flavor or identity that in this example should remain in the mix. Alternatively, favorite models may be mixed together and new design elements may be added. It will be appreciated that there are many ways to approach design with the design tool described herein, including such considerations as aesthetics, brand identity, and function. Selectable morphable features include features named herein as well as others that may be recognized by persons skilled in the art of vehicle design.

In a first embodiment, the user's interaction 110 with the system and method is driven by a user interface, the display 108 and manual input 112. Referring now to FIG. 4, on the display 108, the MIX button 120 brings up the set of vehicles from which the user may choose. In general, this set of vehicles may be called a catalog 118. Here reference is made to the drawing of 2D data although in another embodiment 3D data may also be used.

Referring still to FIG. 4, a smaller set is selected by the user from a larger set of exemplar vehicles, in this example including forty-four exemplars. Here, for example, a plurality of vehicles 130, 132 and 134, are combined. On one or more screens there may be any number of exemplar options. Exemplars may be added to the mix 136 or removed from the mix 138. In this way the user 110 can select particular exemplars to build a morphable model (via 140). Selecting the mix provides a step that sets the initial information for the statistical model. A morphable model includes a statistical model derived from a design space or a PCA (Principal Component Analysis) space.

A morphable model summarizes the space defined by exemplars. Any point in the space can be considered a "morph" of the exemplars, i.e. a weighted linear combination of their features. However, constraints are also applied to features of the morphable model to produce updates of the shape based on optimal estimation. These actions create a new design (a single entity in space), and the process would not typically be called morphing, although the result could still be considered a combination of the exemplars.

Under the ADD button 136 there may be general categories in a drop down menu. Options that may be provided are, for example: processing exemplars, processing only the cars; only the trucks; only the CHEVROLETs; or only the GMCs. Similarly, one could also remove items by the REMOVE button 138. In a similar manner, vehicles may be chosen and the CADILLACs removed. Accordingly, everything would then be in a selected set except the CADILLACs.

Exemplars in the catalog have been through a registration process that may be automatic or manual. Exemplars have been fit so that there is a substantially one-to-one correspondence between them. The pre-imposed mannequins are also subject to this registration process. For example, a particular curve, the front piece of a hood on a car, is numbered 1, and another element is numbered 2. The registration is possible by a process of segmentation that includes knowledge of one of ordinary skill in the art of design of manufactured objects such as vehicles, of how many degrees of freedom are needed to describe a particular car or other geometric shape and how one can correlate that same information to all, or substantially all of the cars in the catalog. The result of segmentation is a set of features that can be put into substantially 1-to-1 correspondence across input vehicles. From these vehicles in correspondence, a statistical model can be produced that captures the similarities in character, style, shape and proportions of the mixed set. An input vehicle includes a particular model, for example, a particular car. Registration includes matching features of the reference model to an input model. A registered model is an input model after registration.

Still referring to FIG. 4, the user 110 uses the interface driven by the MIX button 120 to select items and then build the morphable model 140. As shown in FIG. 4, a user can select individual vehicles, such as a CORVETTE 134, a HUMMER 130 and an SSR 132. A mixture includes a selected subset of a catalog.

Initially, by selecting a mix as described above, the initial probabilities and initial mathematical space are set. An average or mean of these chosen cars is taken to represent the initial morphable model. A morphable model is a statistical model derived from the cars chosen to populate the design space. A design includes a model in the design space. The morphable model can be changed by the user in the manner that the user chooses. The user is able to drive the design tool's output to satisfy aesthetics, and impose functional and engineering constraints on the desired design. Once a morphable model is generated, the user can select a particular place, space, or feature to modify, for example, a windshield or window. As an example shown in FIGS. 5 and 6, a rear window is changed from the initial, average model to that of a morphed model. As discussed above, selectable features to control morphing are numerous. In this example of FIGS. 5 and 6, the user can click a point at the base of the rear window and move it to modify the shape.

Figure 5:
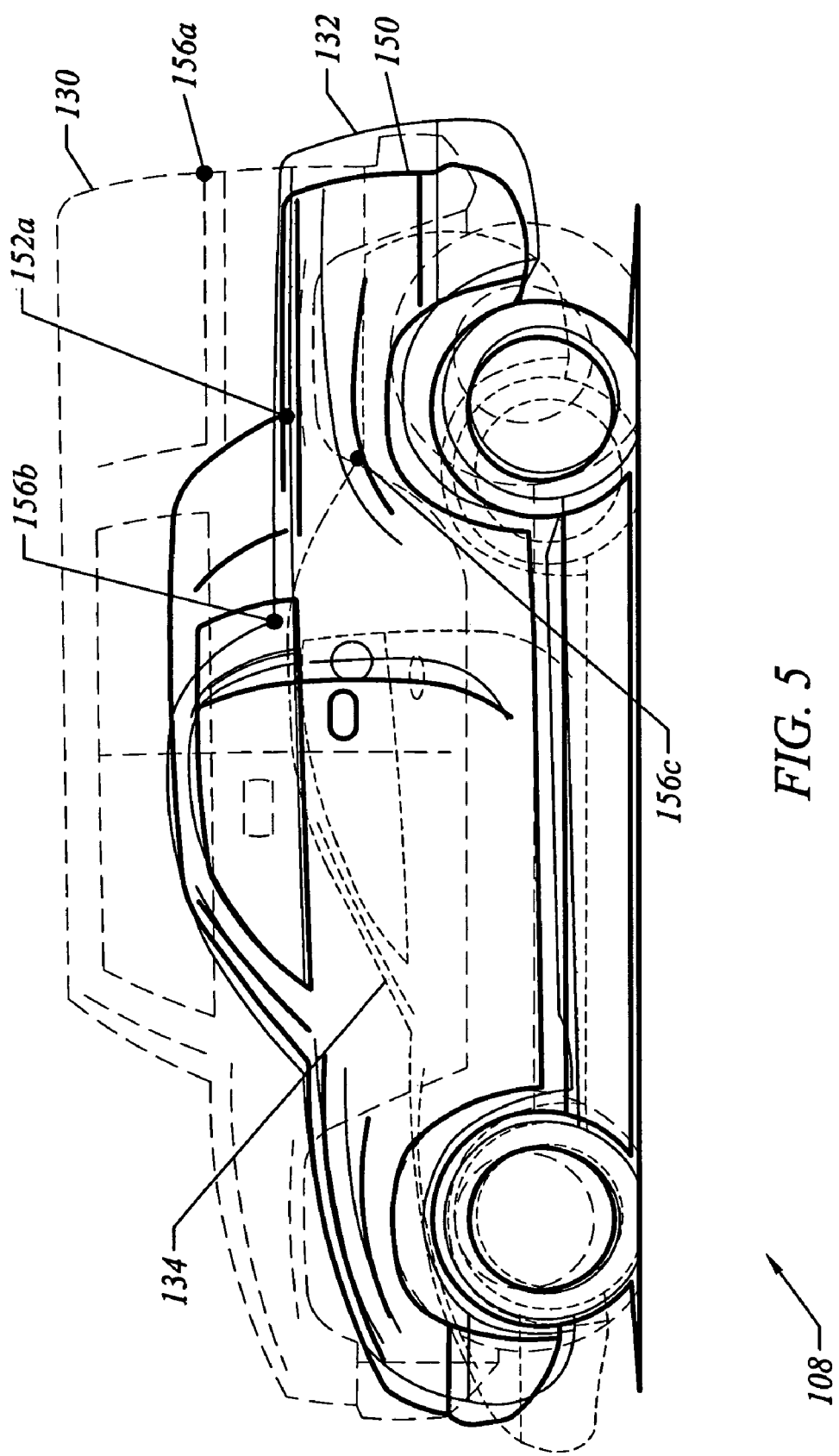
FIG. 5 is a screen display where three exemplars are shown in the background and a morphable vehicle is shown in the foreground.

FIG. 5 shows a display screen 108 having a mix of a HUMMER H2 130, the CHEVROLET SSR 132, and the CHEVROLET CORVETTE 134. The average of the three vehicles 150 is shown, representing the morphable model. In this way it is possible to combine different categories such as trucks, SUVs and cars together in a single representation.

On the display screen 108, the average model 150 may be shown in one color for example and the exemplars may be in other colors behind the average model indicating the mixture. The designer may choose the colors.

On the display 108, grayed out, the HUMMER and the CORVETTE, and the SSR, are displayed; their average may be displayed in black. The resultant average vehicle 150 is approximately the size of the SSR.

In this example the user then may pick a point or a curve on the average vehicle to pursue changes to the morphable model. For example, the user may pick a point at the rear window 152a. By selecting the rear glass to modify the user can move that point up to make the vehicle more HUMMER like and move it down to make it more CORVETTE like. It may continue to include some of the character of the SSR.

Figure 6:
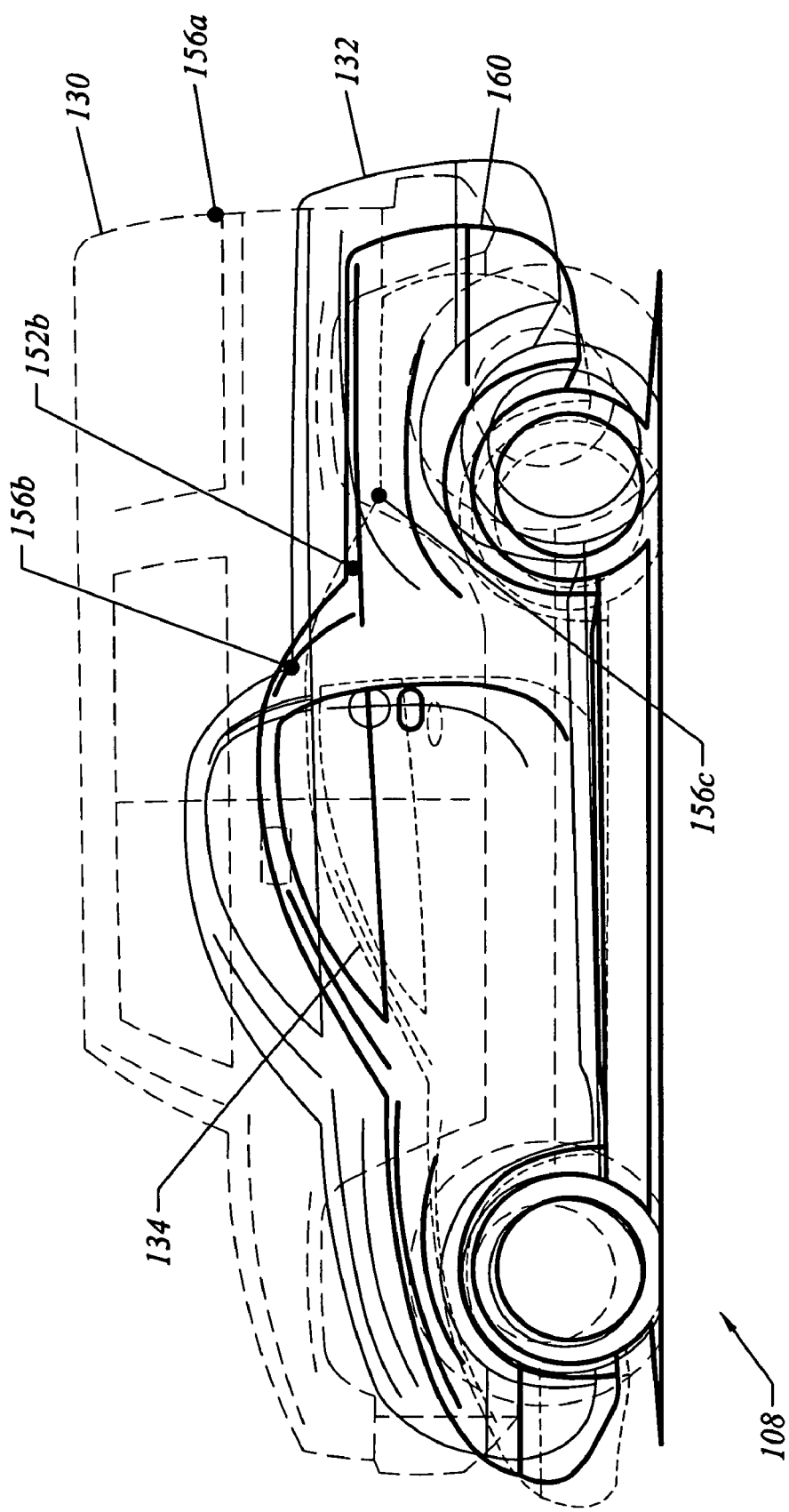
FIG. 6 is a screen display where three exemplars are shown in the background and a morphed vehicle is shown in the foreground.

A drop-down menu or any other user interface may provide a list of points or options for the designer to pick from to alter the resultant vehicle. Or the user may simply click near or on the rear window to select the point 152a. In the example, the point 152a represents the rear window. By clicking the point 152a, a cluster of points 156a, 156b and 156c may be provided on the display 108. The cluster of points shows the space in which the mix of cars' rear windows resides as shown in FIGS. 5 and 6. In other words, the cluster of points gives the user an immediate indication as to the extent of the design space for that feature from the exemplars. The cluster may or may not be shown on the display but if shown may be used as a guide. In this way the user can drag the point 152a to the position of 152b in FIG. 6, knowing that he is still within the prescribed design space of the mixture.

The average vehicle 150 morphs into the morphed vehicle 160. As the point is dragged the morphing may show on the screen in a continuous interactive manner. From the registration process, curves that are related to each other from the registered exemplars defining the design space may change consistently together. Manipulating exterior vehicle curves will change the packaging curves and visa versa. This dynamic interaction of styling and packaging is available immediately to the designer to aid the aesthetic creation process. Alternatively, when the point is dragged, the morphed model 160 may update when the mouse button is released or at any point therebetween.

The designer may drag point 152a to a point outside of the space created within 156a, 156b and 156c. However, the model may break down when manipulated outside the bounds of the design space as defined by the examples.

Figure 7:
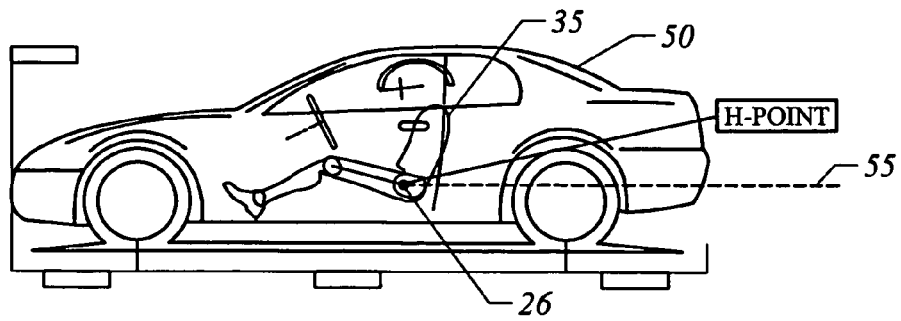
FIG. 7 shows the mannequin positioned within a vehicle.
Figure 8:
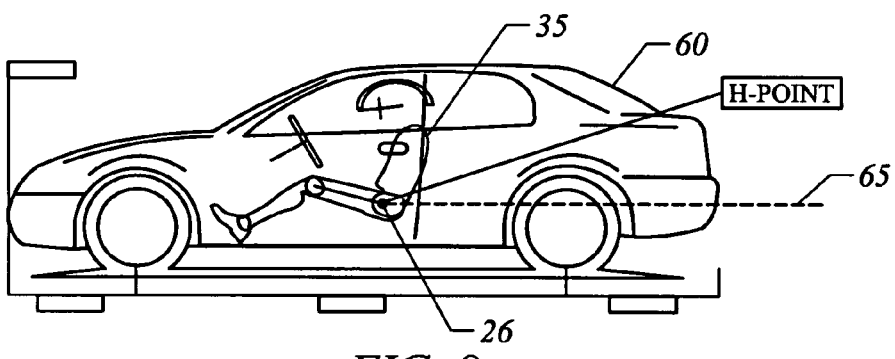
FIG. 8 shows the mannequin positioned within a vehicle.
Figure 9:
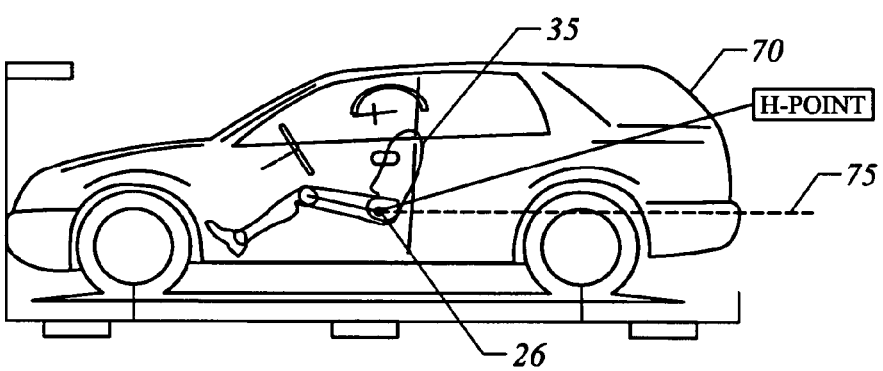
FIG. 9 shows the mannequin positioned within a vehicle.
Figure 10:
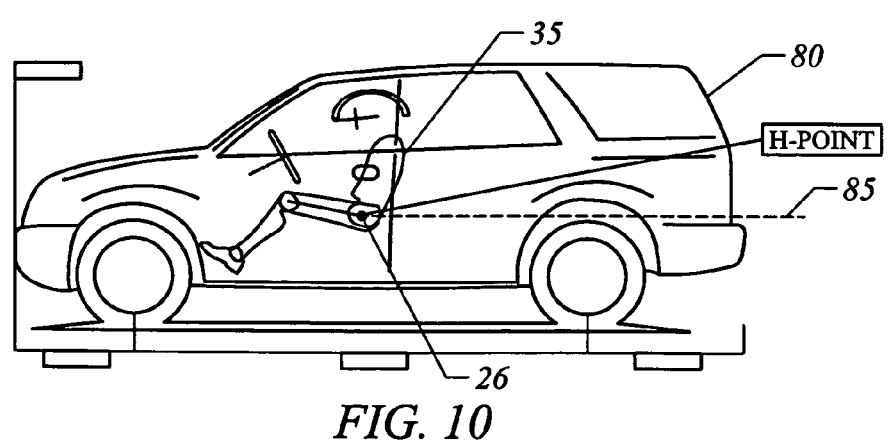
FIG. 10 shows the mannequin positioned within a vehicle.

FIGS. 7, 8, 9 and 10 show the mannequin 35 positioned within a vehicle. In FIG. 7, the vehicle 50 has the shape of a sedan. Vehicle 50 is a mix of at least two vehicles chosen from a catalog. If the user 110 clicks on H-point 26 and drags the point upward vertically, the vehicle 50 will morph in response into that vehicle 60 shown in FIG. 8. H-point 26 in FIG. 7 is at the position 55. H-point 26 in FIG. 8 is at position 65. Likewise, when the user 110 continues to drag H-point 26 upwardly, the vehicle 60 will morph in response into that vehicle 70 shown in FIG. 9. H-point 26 in FIG. 9 is at position 75. Pulling the point up vertically from position 75 to position 85 of FIG. 10 will morph vehicle 70 into vehicle 80, having a shape of an SUV. In this way, the operation on the mannequin 35 as a feature will result in a morph of the subject model.

The catalog of designs includes geometric design data, coded into a representation such that different, but related, designs may be put into correspondence, and in this case, including a mannequin. The coding may, for example, entail segmenting a geometric design into points, curves or surfaces. Some or all designs in the catalog may be represented as an array of values that characterize the vertices and curves for that design. Corresponding values in different arrays map to corresponding vertices and curves in different designs. On the other hand, one or more catalogs of any number of objects or features such as the mannequin 35 in the driver's position may be included. For example, the model may contain mannequins in the back seat of the vehicle. One or more catalogs may provide a statistical basis for the class of shapes that are generated by the method, system and apparatus described herein.

To build a morphable model from the selected set of exemplars, the set of mathematical arrays, one array representing each of selected designs 130, 132 and 134, may be manipulated using statistical methods to extract their relationships and take advantage of redundancies in the data arrays representing the geometric designs. For example, a mean or average array may be calculated, whose elements are calculated by averaging corresponding elements of the arrays. Similarly, a covariance matrix may be calculated from the data arrays, once the average array is calculated.

Morphing with statistics supports consistency of the resulting design. In the statistical methods as described in detail below, the more models used, the more accurately the model class may be described by the statistics. Other statistical models may be used that operate on less data. Mathematical methods including statistics are described for their ability to reach results, and any other methods used to reach the results are considered within the scope of this disclosure.

One skilled in the art of vehicle design will recognize that the vehicle design process typically begins with vehicle criteria. Some of such criteria include points called "hard points" which in certain circumstances should not be changed. Hard points may be categorized according to vehicle architecture class, for example. A resulting set of dimensions for hard points is therefore developed and communicated to a designer. The designer may then typically design the vehicle exterior with constraints given on the location of at least some of the vehicle hard points. The designer may then manipulate the features of the statistical model corresponding to these hard points to conform with standard dimensions.

The process, system and apparatus described herein may be applied by vehicle designers in additional ways. For example the vehicle models may be used to design a vehicle interior from a plurality of vehicle interior exemplars. Also, the interior and exterior may be designed simultaneously. Additionally, plural vehicle interior exemplars and plural exterior exemplars may be used independently to form separate exterior and interior resultant statistical models. These separate models may then be combined into a common coordinate system by, for example, causing the hard points of the models to conform to one another. The designer may then adjust the interior and exterior models simultaneously with a single selection or with multiple selections. Cluster points similar to those as described above in reference to FIGS. 5 and 6 may be used to guide morphing of interior models.

As described above, the method, system and apparatus described herein provide the designer the ability to be creative and to drive the output. For example, the designer may be working in a space that includes angular exemplars, but may wish to add some curvature. The designer may add a previously registered round shape to the mix for that result. In this way, design qualities or features may be added into the mix. In addition they may be weighted, for example as 50 cars and 1 round shape, or weighted as 25 round shapes and 25 cars. The average and the statistics can be changed by the designer's choice. A slide bar or other similar interface may provide the user the ability to specify weights.

As noted with the previous example, exemplars may include other items than existing vehicles. New designs, not yet built into production models, may also be included. Different shapes having other purposes than vehicle bodies may also be used as exemplars.

The design space may be large. The designer can use the mixer to select a smaller set of models appropriate to his design goal. For example, if only CADILLAC vehicles are chosen for the mixture, the design space will reflect the characteristics of CADILLACs.

Figure 11:
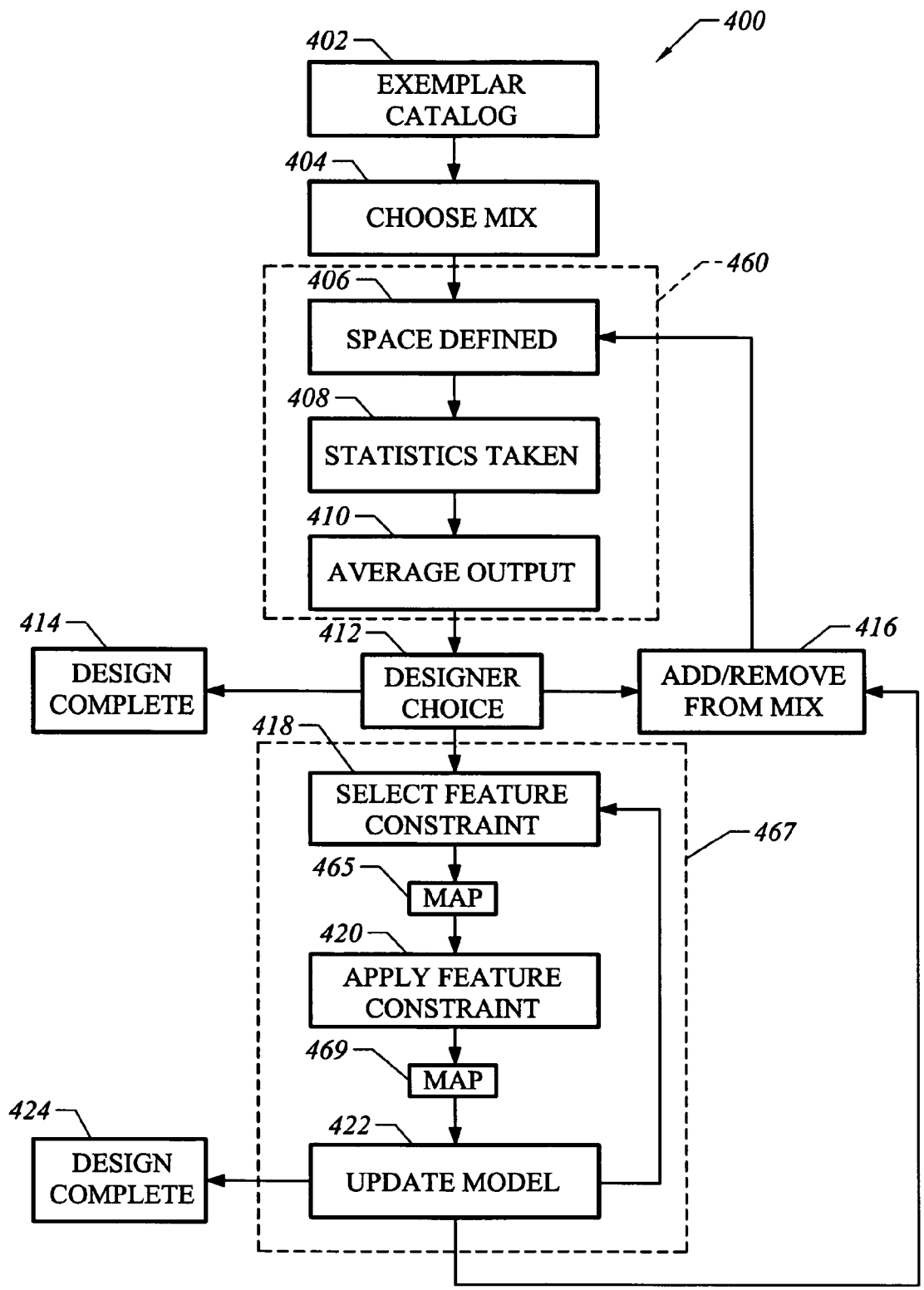
FIG. 11 is a flowchart illustrating different actions available to the user.

Referring now to FIG. 11, a flowchart showing an embodiment of the method described herein is shown at 400. The flowchart is a high level overview of the options available to the user in the creative process. During the steps, mathematical algorithms are used to process data and provide the output along the way.

A catalog of exemplar designs is provided at 402. Designs of the catalog may comprise a collection of points and curves (or other features) conforming to a design topology. Here the design topology, also referred to herein as a topology, and denoted $\Omega$, is a finite set P of points $p_1, p_2, p_3, \ldots$, and a finite set C of curves $c_1, c_2, c_3, \ldots$, along with a mapping between the two sets. This mapping may be such that exactly two points map to a given curve. These two points constitute the endpoints of the curve, which may be taken to be a straight line segment. In another embodiment, four points may map to a given curve, which may be taken to be a Bezier curve. In this case, two of the points are endpoints of the curve, and the other two points are the remaining two control vertices for the particular Bezier curve. In addition, except for exceptional instances, an endpoint maps to at least two curves. Either of these specifications of the design topology defines how the curves are connected one to another by specifying the points that are common between two or more curves. Further specifications of the design topology may instead employ NURBS, or polygons, and so on. Designs used as exemplars for the same design space use the same topology, and this enables designs to be placed in substantially one-to-one correspondence, previously discussed in reference to the catalog shown in FIG. 4.

Figure 12:
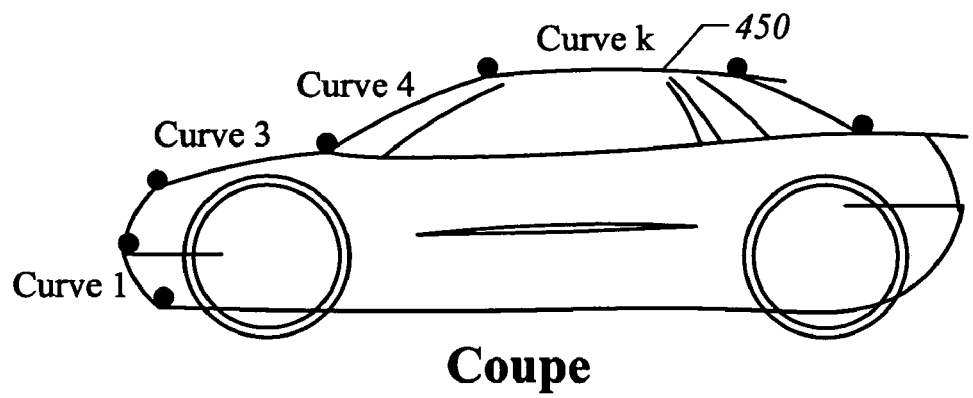
FIG. 12 shows a truck and a coupe.
Figure 12:
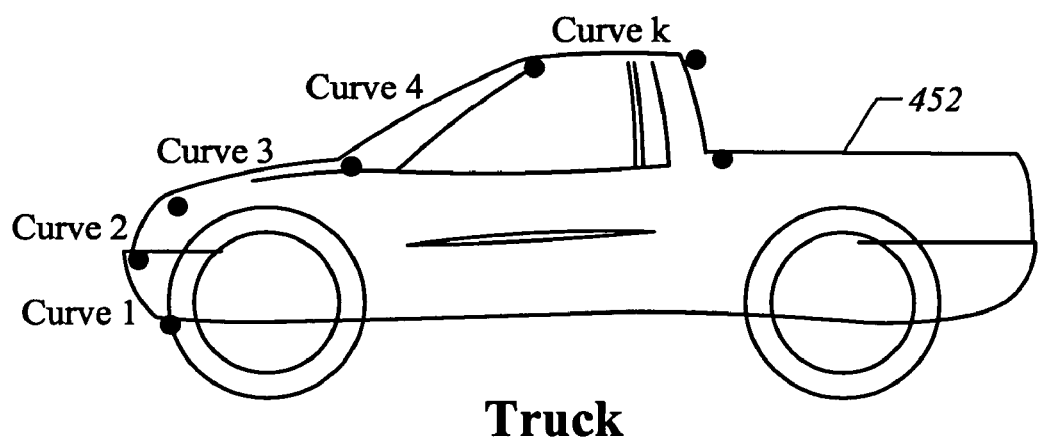

As an aside to illustrate the correspondence, FIG. 12 shows partially detailed outlines of a coupe 450 and a truck 452 that have features in correspondence. Corresponding curves in the coupe and truck outline may be different, but the correspondence provides that they may be represented by the same curves, Curve 1 through Curve k. For example the coupe 450 and truck 452 may be used as exemplars chosen from the catalog to create a model design space.

It may also be part of the definition of a design topology that two curves meet at a common endpoint, i.e., no two curves cross at an interior point of either curve. Compliance with this part of the definition of a design topology may be checked after coordinates have been provided for the points $p_1, p_2, p_3, \ldots$ Note that this definition of design topology is not limited to points and curves. As one example, this definition of design topology may be extended to include, for example, a finite set T of triangles $t_1, t_2, t_3, \ldots$ with mappings between P and T and between C and T, consistent with one another and with the mapping between P and C, so that three endpoints map to a given triangle, and three curves map to a given triangle. Moreover, an endpoint maps to three triangles, and a curve maps to two triangles, in general. With this definition of design topology, the connectedness of the triangles used in, say, a triangulation of a vehicle body, may be specified by the points that are common between any two triangles, and the curves, or edges, that are common between any two triangles. With this definition, 3D design exemplars may be used. It will be appreciated that other modifications and extensions to the definition of design topology may be used.

In the case where a topology includes a set of triangles T, it further may be a part of the definition of the topology that two triangles intersect at a common endpoint or common edge, so that no two triangles cross in the interior of one or the other. As with the part of the definition of design topology discussed earlier that two curves meet at a common endpoint, this further part of the definition of the topology may be checked for compliance after coordinates have been provided for the points $p_1, p_2, p_3, \ldots$ It is to be noted that neither non-intersection requirement discussed above is a requirement or restriction on the design topology itself, but rather a stipulation of what it means for a design to conform to the topology.

Returning now to discussion of the method shown in the flowchart of FIG. 11, exemplars in the catalog have values assigned for points $p_1, p_2, p_3, \ldots$. A point $p_i$ may have an ordered set of values—e.g., $(x_i, y_i)$ for 2D, or $(x_i, y_i, z_i)$ for 3D. The set of points P with their ordered values comprise a feature vector x. For 2D design data, for example, x may have the form, $x=(x_1, y_1, x_2, y_2, \ldots)$. Thus, an exemplar has a feature vector x, whose elements appear in a canonical order prescribed by the topology. The number d of components of x depends on the type of design data, e.g., 2D, 3D, and so on. It is also within the scope of this discussion that x may contain numerical data other than coordinate values, e.g., engineering analysis data or consumer response data.

A selection of exemplar designs from the catalog provided at 402 is chosen at 404. This selection may be made through a user interface, as discussed earlier in reference to FIGS. 3 and 4.

Once a mix of designs has been chosen in step 404, the design space is defined at 406. Since designs in the mix substantially conform to a particular design topology, a particular point defined in the topology has a value for its coordinates, for the designs in the mix. Thus, an element of P, e.g., $p_4$, may be associated with a cluster or "cloud" of points, the points of the cloud coming from the particular value of $p_4$ for one of the exemplars in the mix. The collection of the clusters, roughly speaking, defines the design space.

More precisely, the design space is defined by the statistics of the feature vectors x for the set of designs selected for the mix. This definition may be augmented by associating with the set of chosen designs a joint Gaussian probability distribution for the values of the coordinates of points of the design topology, i.e., a joint distribution for the feature vector components. This joint distribution is constructed from the set of selected designs so as to have the same values for the first and second moments as would be obtained from the statistics of the set of selected designs.

It will be appreciated that the use of a Gaussian distribution is not necessary; another probability distribution may be more appropriate in particular applications. In fact, it may be desirable to provide a choice of probability modeling functions through buttons or menu pick lists on the user interface. Preferably, a Gaussian distribution may be used as a default probability modeling function. However, use of a Gaussian distribution in this discussion is not intended to limit this disclosure. The basic properties of the design space defined at 406 derive from the statistics of the feature vectors of the set of designs selected for the mix.

Figure 13:
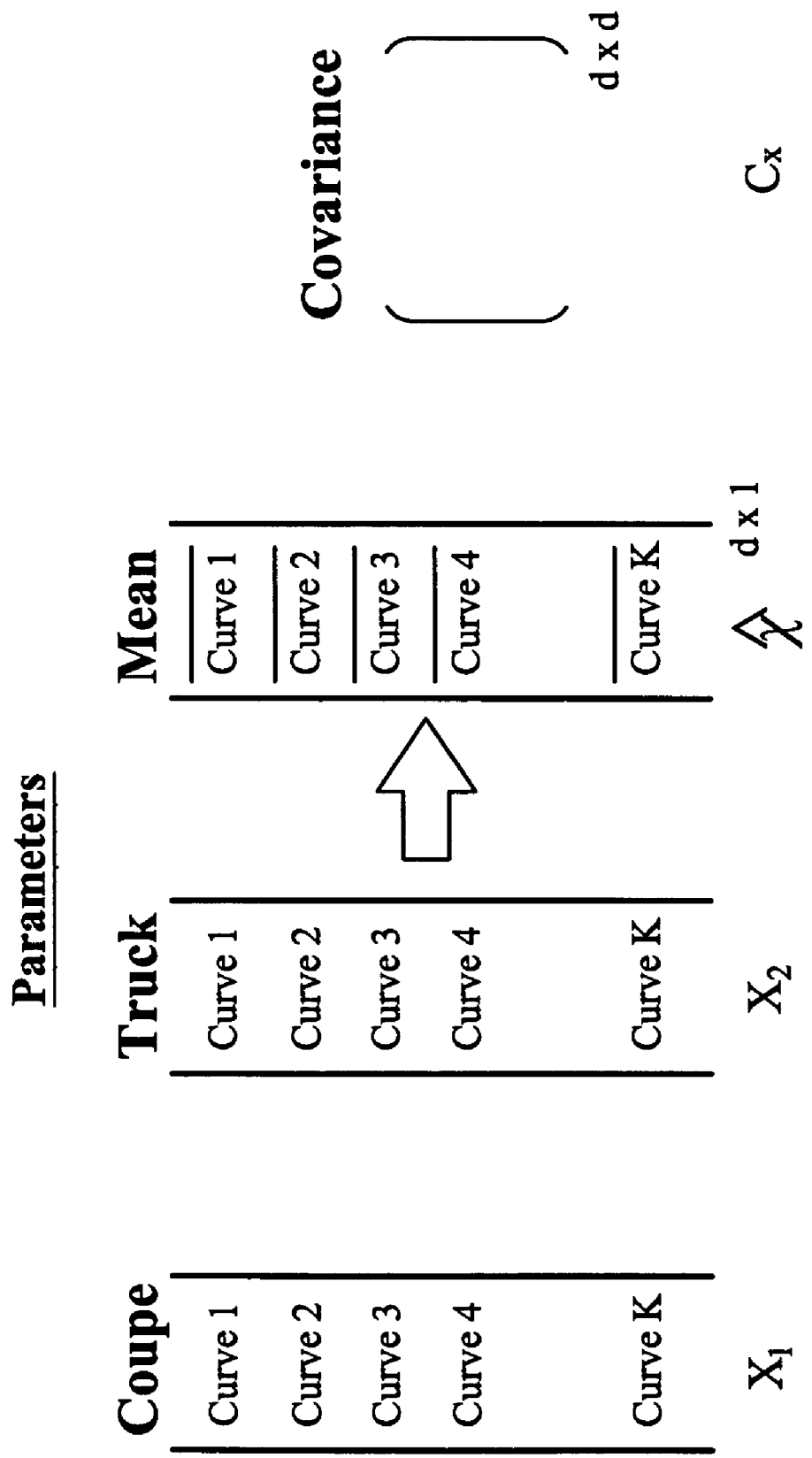
FIG. 13 shows steps using information relating to the truck and coupe of FIG. 12.

In particular, the statistics of the feature vectors provide for determining the average value for the coordinates of the points $p_1, p_2, p_3, \ldots$, i.e., the average feature vector. This is shown in the flowchart at 408. The set of average values for the feature vector x comprises the average design. This average design may be output; outputting of the design may include storage in memory or a more permanent storage medium, rendering to the display, and so on, at 410. Preferably the average design is at least rendered to the display. The statistics of the feature vectors also provide for determining the covariances among the feature vector components. The statistical model is also referred to herein as a morphable model. To illustrate steps 406, 408 and 410, refer to FIG. 13 that shows the data flow from the vector parameters. By combining curves 1 on each vehicle, the average curve 1 results. When done for all the curves, the average vehicle results. Since the curves 1 through curve k are substantially registered, the mean of the coupe 450 and the truck 452 curves may be derived, and then the covariance matrix may be determined. These algorithmic steps carried out by the system and apparatus are performed to form the mix of vehicles suitable for morphing, alteration or manipulation as described below.

Again referring to FIG. 11, designer input is provided for in the step at 412. Here, a user may opt to save the design, as a completed design, as shown at 414. A user may instead opt to add an additional exemplar design to the mix, or remove a selected design from the mix, as shown at 416. Either of these actions by the user at 416 generally causes a return to the design space definition step at 406.

Now that a morphable model is generated, a user may opt at 412 to select a feature constraint, as shown at 418. Such a feature constraint may include a choice of a point of the design, or a choice of an engineering constraint, such as H-point or even aerodynamic drag (using a linear approximation to the drag coefficient); or a choice of a styling constraint, such as wheelbase. The constraint choice may be implemented with a matrix function H as discussed below. The choice of a point may generally be made through the use of a mouse or other pointing device, as known in the art. In the example of morphing as shown in FIGS. 5 and 6 where a point on the rear window was moved causing the entire vehicle to change, the point may have been selected from a list of morphable features.

Another feature constraint may be the H-point 26 of mannequin 35. As described above in connection with FIGS. 7-10, moving the H-point on a morphable model brings about morphing of the model, in the same way as selection and manipulation of any other feature constraint would.

Feature constraints are functions of the model features, referenced as "H" in the mathematical detail later. For example, a wheelbase length constraint could be defined as in the following. A vehicle may be aligned with a coordinate axis—for example, the X axis—so that the distance between two points along this axis is just the difference of their x-coordinates. Suppose the features of the model are kept in a column vector of numbers called 'x', that includes the points for the centers of the front and rear wheels on the driver's side. One of the rows of the matrix H—say the $i^{th}$—may be composed of all zeros, except with a '1' in the same position of the $i^{th}$ row of H (for example $H[i,j_1]$) that the x-coordinate of the center of the rear wheel occupies in the feature vector ($x[j_1]$), and a '−1' in the position of the $i^{th}$ row of H (for example $H[i,j_2]$) that the x-coordinate of the center of the front wheel occupies in the feature vector ($x[j_2]$). The ith element of the product H*x evaluates to a result that in this example is the wheelbase length. (The product H*x is called 'z' in the mathematical detail later.)

Different 'H' matrices or functions multiplied by the features 'x' compute different lengths, positions, or other quantities, on one or more features, by varying the numbers in H. Examples of H that are considered important to constrain the model may be defined in advance, and may be stored in a menu or list for selection (see FIG. 11, Box 418).

The particular value of 'z' for any particular function H (e.g. wheelbase length) depends on the current value of the features in the model 'x'. When the designer wishes to change the design so that the wheelbase length is different than the current value of 'z', he provides a new value, for example 'z0' through a slider, or other means, indicating that the constraint must be applied with the new value (see FIG. 11, Box 420), and the whole model updated in some consistent fashion as a result.

The system uses a method to update the current design (see FIG. 11, Box 422) based on satisfying the given constraints on a few features, and finding a solution (among many possible solutions) for values of all the rest of the features that additionally is "best" or "optimal" in some sense. To do that, it uses the statistics of the examples used to form the model space. The current design is represented both by the values of the features in 'x', and also the covariance matrix of the features, which describes which features vary together, and by how much, in the example set. One kind of "optimal" solution is one that minimizes the covariance of the features, after satisfying the constraints. This is the "optimal estimation" procedure described below. It is mentioned that if a deterministic (non-statistical) interpretation is desired, the optimal estimation described is then equivalent to minimizing the sum of weighted, squared deviation errors between the solution feature set and the examples. The solution (from among many) that has the minimum total error in that case is the chosen solution.

The constraint functions do not need to be linear functions. They may also be non-linear—referenced as 'h( )' in the mathematical detail below. In that case the "optimal" solution, or the solution that has minimum total error is not guaranteed to be optimal or minimum over the entire design space, but only in the neighborhood of the current design values.

Once the feature for manipulation is selected the next step in the flowchart of FIG. 11 takes place. At step 420, the design tool allows the feature constraint to be applied. Accordingly, if the selected feature constraint is the rear window point, it may be moved or dragged to a new position on the screen.

Selectable feature constraints may be provided in a drop down menu, having a pick list for, e.g., H-point or wheelbase or any other suitable user interface. The step at 420 in FIG. 11 may also encompass, for example, selection from a library, inputting a value, or adding a new definition. The selectable feature may also be adjustable in value by the user using, for example, a slider or drop down menu or any other suitable user interface.

The update step is shown in the flowchart of FIG. 11 at 422. Typically other points of the design, besides the selected point, are moved as a result of the update step, due to correlations among geometric features in the design statistics. As part of the update step, the resultant design may be rendered to the display. At this point, a user may opt to save the design, as a completed design, as shown at 424. The new design has a new associated feature vector.

If the selected point has been moved outside the extent of the usable design space, the user may see intersection of one or more curves or triangles at an interior point of one of the curves or triangles, signaling nonconformance to the design topology, and breakdown of the morphable model. This caricaturing phenomenon provides feedback to the user on the usability of the current design.

A user may choose to pick a new point or feature constraint, returning again to 418. Note that the "new" point or feature constraint chosen in this step may, if the user wishes, be the same point or feature constraint as one chosen earlier during the design session. Once again, in the case of a selected point, for example, the user may execute the step of dragging the selected point to a new position as rendered on the display, with morphing of the design to a new design taking place.

Another option, among many other possible options such as those described and contemplated herein, is for the user after the update step to add an additional design to the mix, or remove a selected design from the mix, as shown at 416. As previously discussed, either of these actions by the user at 416 generally causes a return to the design space definition step at 406.

The current design as shown on a display screen 108 or stored in a different step includes the chosen design that may be the optimal design. An optimal design includes the design that better or best meets given constraints and/or criteria. FIG. 11 may be considered a high level system diagram further illustrating the cooperation of object shape design modules including an optimal estimate update module 422.

The input 102 is receptive of a catalog module 118 of plural object designs selected from datastore 116. Pattern and extraction module 460 extracts patterns and relationships from the plural object designs to develop a general statistical model 408 of a vehicle based on previous designs in the datastore 116. Put differently, the extraction module is adapted to extract patterns and relationships from the predefined vehicle models to form a statistical vehicle model providing plural, selectable vehicle shapes. Moreover, the extraction module is adapted to extract patterns from vehicles whose parameters, for example, might be points, lines and curves. The vehicle model input 102 is receptive of a set of predefined vehicle models 118 that are selected based on a predetermination of a market segment for a new design.

As described above, the general statistical model provides a variety of selectable shapes defined in terms of combinatorial relationships between parameters. These relationships are well-defined within the bounds of the extremes given by the input designs as shown in FIG. 4. A modeling module is adapted to allow a designer to manipulate the statistical model by applying designer selections received from designer input such as by a mouse, keyboard or touchscreen. The general statistical model provides an infinite variety of derivable shapes that can be defined in terms of continuously variable parameters.

The selected shape is stored in the datastore 116 and is visually rendered to the designer via an active display. The designer evaluates the selected shape and may save the shape in datastore 116 as a new vehicle concept. Multiple vehicle concepts may therefore be developed and employed in a vehicle design process.

It will be understood that extraction module 460 (or a collection of modules adapted to perform various functions) is adapted to calculate means from correspondences between parameters of the predefined vehicle models and to calculate a covariance based on the means. The extraction model is further adapted to perform dimensionality reduction of the design space. Moreover, the extraction module is adapted to employ a principal component analysis, or method providing similar results, to perform the dimensionality reduction. Furthermore, the extraction module is adapted to extract patterns from a plurality of vehicle parameters represented in vector space, thereby generating the statistical model in a design vector space.

Constraint module 467 may constrain the design by the limitations of the original set of example designs. On either side of the constraint module 467 are mapping modules 465 and 469. Mapping module 465 maps a high dimensional space into a low dimensional space of principal components. Mapping module 469 maps a low dimensional space of principal component to a high dimensional space. A user views on a display screen an image or representation of a geometric design of a high dimensional space. However, the large amount of data is prohibitive in providing on-screen editing of such an image for an average CPU. By editing, here it is meant constrained model editing and the calculations needed to perform it. That is, an average desktop computer does not have the computing power to quickly respond to high dimensional constrained editing input by the user. Here, the dimensions of the problem are reduced. Briefly referring to FIGS. 5 and 6, depicted is a point that has been dragged by a user so that from FIG. 5 to FIG. 6, the whole image is modified as the point is moved. That is, in FIGS. 5 and 6, it is shown how a designer might drag a "hard point" on a vehicle rear window while the vehicle continuously changes. In order for the point to move and the rest of the image to change accordingly, the high dimensional space of the image is mapped to a low dimensional space where the morphing process occurs. The high dimensional space may be displayed on a display screen for a viewer to see while the low dimensional space is transparent to the user. Once the morphing process has occurred in the low dimensional space, the low dimensional space is mapped to the high dimensional space. The speed at which this mapping, morphing and mapping process occurs provides the appearance of a seamless editing or morphing process on the display screen.

Constrained model editing provides the power to change the design globally, and consistently within the model space, with only a few interactions by the designer. As shown in FIGS. 5 and 6, the effects of editing are not local to the feature being edited. Constraint module 467 includes constraint feature module 420 and optimization (which also may referred to as optimal estimation and update) module 422. The constraint module is described in more detail below.

Optimal estimation module 422 provides optimal estimation techniques to generate a design within the statistical model that meets preferred designer specifications. The optimal estimate computation includes computing the hard points of the new design shape given the constraints defined in the feature constraint module 420. If the wheel centers are features of the design, a matrix H can calculate the difference of those features along the vehicle length axis, and a vector z, as detailed below, can be designated by the designer as a desired wheelbase dimension, perhaps by entering it numerically.

As explained in detail below, z may be assumed to have a probability distribution characterized by additive noise v with covariance R. The magnitude of the covariance (R) for v compared to the magnitude of the system covariance used by H determines how precisely the new value is adopted. In the case of moving a point, the designer may want to specify the location exactly ($R \rightarrow 0$). However, it is possible to let the design "pull back" and settle into a state that is influenced less strongly by the manipulation (in that case R is larger, allowing the dragged point position, for example, some variability in subsequent steps). When a range of values is permissible, e.g. a range of wheelbases, increasing the value of R allows the design to find an optimum balance of this and other constraints. This relative weighting is also a designer-specified value, perhaps through a slider.

Turning now to a more detailed discussion of the three steps 418, 420, and the update step at 422 of FIG. 11, and 418$a$, 420$a$ and 422$a$ of FIG. 14, the mathematics described below allows the very large amount of data to be reduced for computations and then be expanded for display and further manipulation. Accordingly, data in a high dimensional space is mapped to a low dimensional space and then mapped back to the high dimensional space once the user's manipulation of the design on a display has been processed. In this way, a user is able to watch morphing occur as the selectable features are processed.

The abstraction of the design process, in terms of the mathematical model, may be given by the following steps: (1) specify the model space for the new creation, which was discussed above; (2) review the current shape, or read out geometric values (e.g. dimensions); (3) apply constraints to parts of the geometric shape, reducing freedom in the design space; and (4) add innovation, adding freedom back into the design space.

In the first step, exemplars are chosen to populate the object space with the right character. This is like the pre-determination of a market segment for a new design, resulting in a population of past, present, and concept vehicles as context for the designer. The choice of exemplars for the object space is part of the creative process. The discussion below shows how the exemplars are processed to produce a usable low dimensional space (with a compressed representation characterized by u and Λ, to be defined and discussed below).

The remaining steps are used iteratively, although at any moment one will apply. Step 2, review the current shape, or read out geometric values (e.g. dimensions), was discussed with reference to the step for providing the average output 410 in FIG. 11. In these cases, it is preferable to maintain the low dimensional space—so computations can be performed quickly—yet provide the mapping to the original feature space (x) that is meaningful to the designer.

To draw the current shape, or to query the model, mapping to the original feature space is performed. For example, the points at the center of the wheels may be defined in the original feature vector (x), so wheelbase can be defined as the distance between the points. However, the same points may not appear in the compressed representation (u), although they can be reproduced from it. The wheelbase calculation is automatically redefined to use u.

An example of a constraint is the specification that wheelbase be changed to a particular value. The constraint uses the same mapping as the query function. Another example is the specification of the position of a particular model point (during shape editing). In either case, the rest of the shape preferably will assume some plausible values based on the specification.

Finally, it may be the case that the designer wants to isolate part of the design for change, without globally affecting the rest of the design. In that case, the features being manipulated would preferably have their statistical correlations to the rest of the model weakened so the impact on the rest of the design is removed or lessened to a chosen degree.

A model space $(x, \Omega)$ for a design will be defined as a topology $\Omega$, and an associated Gaussian-distributed vector-valued random variable x with given mean $\upsilon$ and covariance matrix $\Xi$ $$P(x) \sim N(\upsilon, \Xi).$$

Estimates of the parameters $\upsilon$ and $\Xi$ will be written $\hat{x}$ and $C_x$, respectively. In the following, the estimates $\hat{x}$ and $C_x$ will be substituted for $\upsilon$ and $\Xi$, in general and where appropriate.

In general, the covariance matrix $C_x$ may be ill-conditioned. A singular value decomposition (SVD) is applied to obtain the principal components characterizing the mix of designs. The reduction to principal components allows the design space to be explored in a generally stable, computationally economical way.

Within $\Omega$ a particular model—$x_1$, for example—may be defined by a vector of d model features in a canonical order, so that the same features are present in corresponding order in the models, as discussed previously. Geometric shape differences among models in $\Omega$ are encoded in the feature vector values. For example, the topology might be a mesh, and the features would be 3D points at the mesh vertices with different values for different shapes. The mathematics herein discussed is indifferent to the contents of the feature vector, and other embodiments may include other properties such as appearance information, engineering properties, consumer scores, and other criteria. The common factor is that features may be functionally or statistically related to the geometric shape.

If a probabilistic interpretation is not warranted or desired, the same mathematics can be developed from recursive, weighted least-squares solutions to the problem. The "weights" may be chosen to be the inverse of the "covariances" calculated in the following.

The definition of the topology has been discussed above. The current state of the design is defined by the topology, and the current estimates of the shape vector and shape covariance matrix, $\hat{x}$ and $C_x$. These estimates are made using the statistics of the feature vectors of the selected exemplars. The size d of the shape vector x can be very great, and the size of matrix $C_x$ is thus the square of that dimension—often large for computational purposes, especially when intended for use in an interactive design tool. The matrix $C_x$ represents the variability of geometric shape features within the set of selected exemplars, and the inter-variability among features. Fortunately, if the exemplars in the design space are cars, the shape features have much more consistently defined relationships than if the space also contained geometric objects from completely different classes (e.g., spoons, or kitchen sinks). Due to this internal consistency, or coherence, there is generally a far smaller, but nearly equivalent set of features and associated covariance matrix (called u and $\Lambda$ in the following) that can be used instead to greatly improve computational efficiency.

Referring to step (3) as described in a paragraph above, that is, reducing the freedom in the design space, Principal Component Analysis (PCA) may be used as a data dimensionality reduction technique that seeks to maximize the retained variance of the data in a (lower dimensional) projected space. The PCA space includes a design space with a reduced number of dimensions via PCA. The projection model can be derived in closed form from the data in a set of examples. The following discussion illustrates the technique.

The projection to principal components is implemented with the eigenvectors and eigenvalues of the sample covariance of the data, $S_x$, with sample mean $\bar{x}$. For n models, $x_1, \ldots, x_n$, let the d×n data matrix be defined as $$\tilde{D} = [x_1 - \bar{x}, x_2 - \bar{x}, \ldots, x_n - \bar{x}].$$

The $x_i$ is a d-component non-random data vector, and typically d>>n. The sample covariance of the data set is then the d×d matrix $$S_x = \frac{1}{n-1} [\tilde{D}\tilde{D}^t].$$

The eigenvectors of $S_x$ and $\tilde{D}\tilde{D}^t$ are the same, and the eigenvalues differ by a scale factor. Since it is sometimes useful to keep the original data matrix, it is convenient to work with $\tilde{D}\tilde{D}^t$ rather than $S_x$.

The eigenvectors and eigenvalues of $\tilde{D}\tilde{D}^t$ can be derived from the Singular Value Decomposition (SVD) of $\tilde{D}$, avoiding altogether the storage and manipulation of the elements of the matrix $\tilde{D}\tilde{D}^t$ (or $S_x$), which can be quite numerous. First, the following factorization may be made.

Using SVD, factor the d×n matrix $\tilde{D}$:

$$\tilde{D} = U\Sigma V^t.$$

Here, U is a d×n matrix, and $\Sigma$ and V are n×n matrices.

By the definition of SVD, $\Sigma$ is a diagonal matrix. Further, the matrix U is column orthonormal, and the matrix $V^t$ is row and column orthonormal (since it is square); i.e., $$U^t U = I$$

and $$V^t V = I.$$

From $\Sigma$ and its transpose, define a new matrix $$\Lambda = \Sigma\Sigma^t.$$

The columns of U and the diagonal elements of $\Lambda$ are the eigenvectors and corresponding eigenvalues of $\tilde{D}\tilde{D}^t$.

Next, in PCA the eigenvalues are sorted by size (largest first). The columns of U and rows of $V^t$ (or columns of V) are correspondingly sorted. If U', $\Sigma'$, and V' are the reordered matrices, the product of the new factors reproduces the original matrix, i.e.

$$\tilde{D} = U'\Sigma'V'^t = U\Sigma V^t.$$

After reordering of the matrices, any zero eigenvalues will be in the last diagonal elements of $\Lambda$ (and thus last in $\Sigma'$). If there are $m \leq n-1$ non-zero eigenvalues from the n exemplars, then rewriting the last equation in tableau $$\tilde{D}_{d,n} = U'_{d,n} \sum\nolimits'_{n,n} V'^{t}_{n,n} = [U''_{d,m} \ A] \begin{bmatrix} \Sigma''_{m,m} & 0 \\ 0 & 0 \end{bmatrix} \begin{bmatrix} V''^{t}_{m,n} \\ J \end{bmatrix}$$

exposes the relevant sub-matrices and their dimensions. The result after multiplying the sub-matrices is $$\tilde{D}_{d,n} = U''_{d,m} \Sigma''_{m,m} V''^{t}_{m,n}.$$

The remaining columns of $U''$ and rows of $V'''^{t}$ are still orthonormal, though $V'''^{t}$ is no longer square. The matrix $\Sigma''$ remains diagonal. Finally, the original value of $\tilde{D}$ is unchanged, though its constituent matrices are potentially much smaller—a benefit for storage and computational efficiency.

The columns of U are the eigenvectors of $\tilde{D}\tilde{D}^{t}$ needed for PCA, and the diagonal elements of $\Sigma$ are the square roots of the eigenvalues.

There are at most $m=n-1$ non-zero eigenvalues in the solution of $\tilde{D}\tilde{D}^{t}$, but $m<n-1$ if "small" eigenvalues are set to zero, as is typical in PCA. These small values correspond to the "singular values" found by SVD, which may be set to zero to improve numerical stability in subsequent calculations. PCA also prescribes setting small eigenvalues to zero as a form of data compression. The existence of zero eigenvalues allows for compressed representation (in u and $\Lambda$, below) to be used.

Assuming no small eigenvalues are discarded (i.e., if $m=n-1$) the (unbiased) estimate of the sample covariance ($S_x$) can be written $$S_x = U\Lambda U^{t}$$

using the definition $$\Lambda = \frac{1}{n-1} \Sigma \Sigma^{t}$$

(this has been scaled from the earlier definition of $\Lambda$, above).

This defines a transformation from the small (m×m) diagonal matrix $\Lambda$ to $S_x$. The inverse transformation is $$\Lambda = U^{t} S_x U.$$

PCA defines the model covariance (estimated as $C_x$) to be equal to the sample covariance $S_x$, so this last equation can be rewritten. $\Lambda$ is the covariance matrix of a new random variable vector u:

$$\Lambda = U^{t} C_x U^{t}$$
$$= U^{t} E[\tilde{x}\tilde{x}^{t}] U$$
$$= E[(U^{t}\tilde{x})(U^{t}\tilde{x})^{t}]$$
$$= E[uu^{t}]$$

where $\tilde{x} = x - \bar{x}$, and E is the operator for taking the statistical expectation value.

Thus $$u \equiv U^{t}\tilde{x} = U^{t}(x - \bar{x})$$

and $$E[u] = \hat{u} = 0.$$

Further, the expression for $C_x$ in terms of $\Lambda$ and U can be rewritten to show the relation of x to u:

$$C_x = U\Lambda U^{t}$$
$$= UE[uu^{t}]U^{t}$$
$$= E[(Uu)(Uu)^{t}]$$
$$= E[\tilde{x}\tilde{x}^{t}]$$

Thus $$\tilde{x} = x - \bar{x} = Uu$$

and $$x = Uu + \bar{x}.$$

The vector u is the projection of x in the m-dimensional principal component space. This PCA projection maximizes the retained variance of $S_x$.

The design state may be defined in terms of the low-dimensional space as $$P(x) \sim N(\hat{x}, C_x) = N(U\hat{u} + b, U\Lambda U^{t})$$

$$P(u) \sim N(\hat{u}, \Lambda),$$

with initial values $$b = \bar{x},$$

$$\hat{u}_0 = 0$$

$$\Lambda_0 = U^{t} S_x U.$$

This discussion of the reformulation of the statistics of the feature vectors of the selected exemplars in the low-dimensional space characterized by u and $\Lambda$ provides further detail of step 406 shown in the flowchart of FIG. 11.

Constraints may be incorporated through introduction of a random vector z, with r components, taken to be a linear function of the d-component random vector x, with constant r×d coefficient matrix H, and r-component random noise vector v, with mean 0 and covariance R.

$$z = Hx + v$$

with components of v uncorrelated with components of the deviation of x from its mean $\upsilon$:

$$E[(x-\upsilon)v^{t}] = 0.$$

The choice of a value for z, and the choice of H, is completely equivalent, in this context, to choosing a feature constraint. This is step 418 in FIG. 11, and also shown at 418*a* in FIG. 14.

The mean and covariance of z, and the cross-covariances of z with x, regardless of the distributions of x and v, are:

$$\hat{z} = H\hat{x}$$

$$C_z = HC_x H^{t} + R$$

$$C_{z,x} = HC_x$$

$$C_{x,z} = C_x H^{t}.$$

If x is Gaussian-distributed, so are the marginal (P(z)) and conditional (P(z|x)) densities of z:

$$P(z) \sim N(\hat{z}, C_z) = N(H\hat{x}, HC_xH^t+R)$$

$$P(z|x) \sim N(Hx, R).$$

Using Bayes' Rule $$P(x|z) = \frac{P(z|x)P(x)}{P(z)},$$

a posteriori density of x given a particular z (both Gaussian) is:

$$P(x|z) = N(\hat{x}+C_{x,z}C_z^{-1}(z-\hat{z}), C_x - C_{x,z}C_z^{-1}C_{z,x}).$$

With z given as the particular function of x above, the conditional mean and covariance are:

$$\overline{x|z} = \hat{x} + C_xH^t[HC_xH^t+R]^{-1}(z-H\hat{x})$$

$$C_{x|z} = C_x - C_xH^t[HC_xH^t+R]^{-1}HC_x.$$

These last two equations are the Kalman Filter Measurement Update equations. As mentioned, deterministic arguments can be used instead of probabilistic ones, and an equivalent recursive weighted least squares solution can be obtained if desired.

To briefly summarize the above description, the reduction to principal components by the Principal Component Analysis (PCA) allows the design space to be explored by morphing and other changes in a generally stable, computationally economical way.

Again referring to FIG. 14, in the notation below, superscript $^{(+)}$ represents the quantity post update, and $^{(-)}$ represents the quantity before the update step 422a.

With the definition, $$G = HU$$

the Kalman Filter Measurement Update formulae can be re-written $$\hat{x}^{(+)} = \hat{x}^{(-)} + U\Lambda^{(-)}G^t[G\Lambda^{(-)}G^t + R]^{-1}(z_0 - H\hat{x}^{(-)})$$

$$C_x^{(+)} = U\left[\Lambda^{(-)} - \Lambda^{(-)}G^t[G\Lambda^{(-)}G^t + R]^{-1}G\Lambda^{(-)}\right]U^t$$

$$= U\Lambda^{(+)}U^t$$

$$\Lambda^{(+)} = \Lambda^{(-)} - \Lambda^{(-)}G^t[G\Lambda^{(-)}G^t + R]^{-1}G\Lambda^{(-)}$$

$$= U^tC_x^{(+)}U$$

Also, $$\hat{u}^{(+)} = \Lambda^{(-)}G^t[G\Lambda^{(-)}G^t+R]^{-1}(z_0 - H\hat{x}^{(-)})$$

can be substituted above, showing the relationship of principal components (u) to the original space, and its re-projection:

$$\hat{x}^{(+)} = \hat{x}^{(-)} + U\hat{u}^{(+)}.$$

The projection to principal components space is then $$\hat{u}^{(+)} = U^t(\hat{x}^{(+)} - \hat{x}^{(-)}).$$

Figure 14:
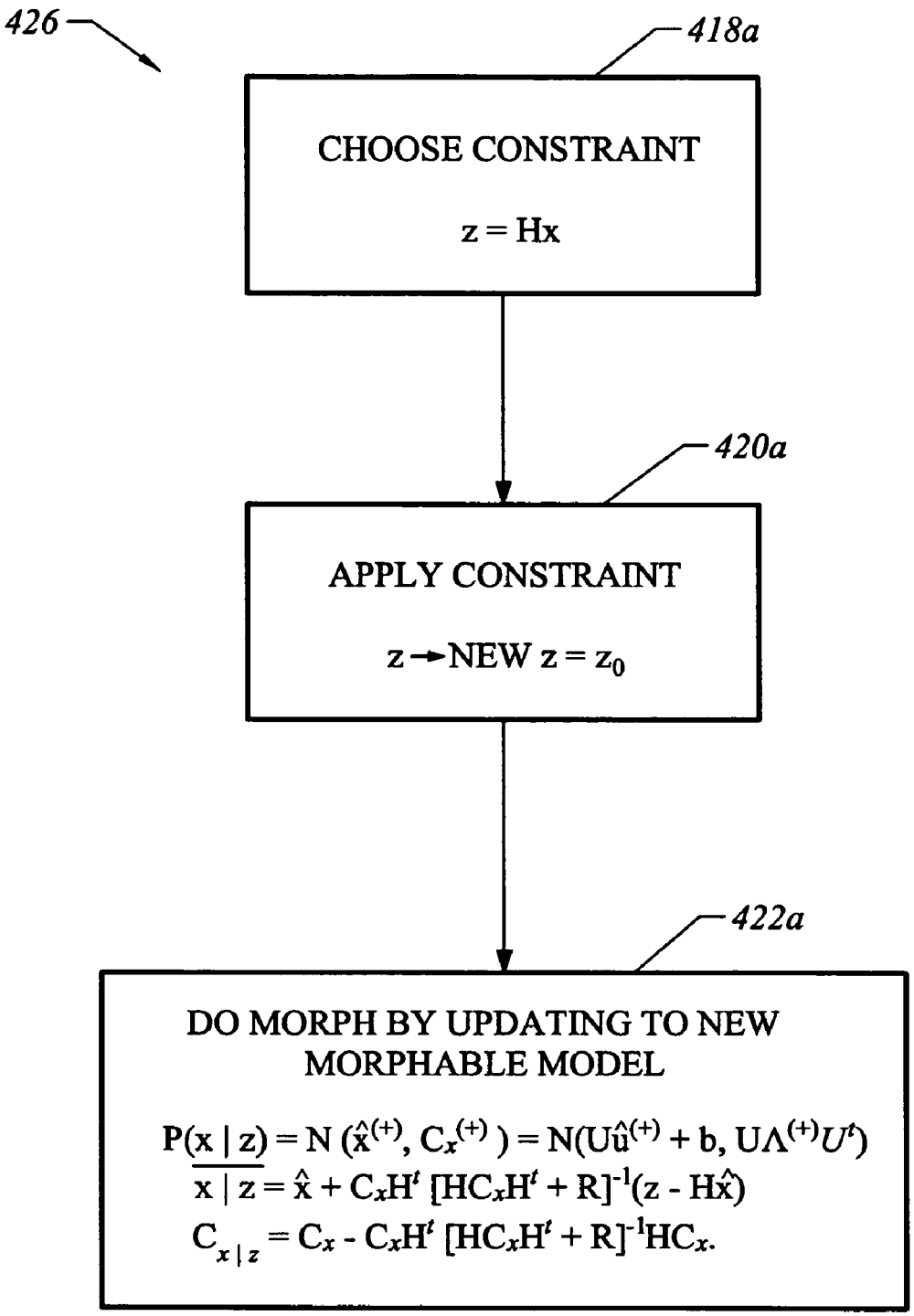
FIG. 14 is a flowchart of the model updating algorithm.

In the above set of equations, the update is driven by the user's choice of a new value $z_0$ for z, shown in FIG. 14 at 420a. As explained further below, joint adjustment of both the feature vector x and the "noise" or variability allowed in $z_0$, provide an optimal estimate for the new feature vector in the presence of the constraint.

It should be noted that when $C_x$ does not have full rank the constraint function H is projected into the subspace as G, which can contain zeros. In such cases, no update of the corresponding components occurs. Those combinations of components have zero variance, however, and are not expected to change. For instance, if an earlier exact constraint had been enforced (with R=0), then the result remains true even in the presence of later constraints. Alternatively, if there was no variation in some combinations of variables in the original basis exemplars, then no manipulation of those combinations is allowed by this mechanism.

As presented, the update equations are the optimal, minimum variance Bayesian estimate, which is equal to the a posteriori conditional density of x given the prior statistics of x and the statistics of the measurement z. A non-linear estimator may not produce estimates with smaller mean-square errors. If the noise does not have a Gaussian distribution, then the update is not optimal, but produces the optimal linear estimate (no linear estimator does better, but a non-linear estimator may).

If the measurement function is non-linear in x, then H is a partial derivative matrix (not constant) and will have to be evaluated. A one-step evaluation of H on $\hat{x}^{(-)}$ yields the Extended Kalman Filter, a sub-optimal non-linear estimator that is widely used because of its similarity to the optimal linear filter, its simplicity of implementation, and its ability to provide accurate estimates in practice. There is also an Iterated Extended Kalman Filter that can be used to significantly reduce errors due to non-linearity.

Thus, assuming a linear function of the state with mean zero, additive noise (v):

$$z = Hx + v$$

$$P(v) \sim N(0, R)$$

The marginal density of z is then $$P(z) \sim N(\hat{z}, C_z) = N(H\hat{x}, HC_xH^t+R).$$

Given the current estimate of the model ($\hat{x}$) the value $\hat{z}$ is expected. Forcing the model to any other given value changes the current model estimate. The minimum variance estimate seeks to minimize the variance of (z−H$\hat{x}$) jointly; i.e., both the estimate of x, and the independent noise v of z are adjusted so that $(z_0 - H\hat{x}^{(+)} - v_0) = 0$. The solution is the mean of the conditional density of x, given the information $z = z_0$.

Using the linear composition z(u)=z(x(u)) the marginal density for z(u) is $$P(z) \sim N(\hat{z}^{(-)}, C_z^{(-)}) = N(H(U\hat{u}^{(+)}+b), H(U\Lambda^{(-)}U^t)H^t+R)$$

and the desired conditional distribution for u is $$P(u|z=z_0) \sim N(\hat{u}^{(+)}, \Lambda^{(+)}) = N(\hat{u}^{(-)} + K_u(z_0 - \hat{z}), \Lambda^{(-)} - K_uC_{z,u}^{(-)})$$

$$K_u = C_{u,z}C_z^{-1}, \quad C_{u,z} = \Lambda^{(-)}U^tH^t, \quad C_{z,u} = C_{u,z}^t.$$

The model estimate is then updated as $$P(x|z) = N(\hat{x}^{(+)}, C_x^{(+)}) = N(U\hat{u}^{(+)} + b, U\Lambda^{(+)}U^t)$$

shown in FIG. 14 at 422a. This update is equivalent to the direct update on x, but without ever computing the large matrix $C_x$. Inspection reveals that the low-dimensional (i.e., r×d) constraint function H can be distributed across the calculation of the vector $u^{(+)}$ and matrix $\Lambda^{(+)}$ (which is no longer diagonal). The matrix $C_x$ need not be created, since it appears in $C_z$ which can be re-written $$C_z = H(U\Lambda U^t)H^t + R$$
$$= G\Lambda G^t + R$$
$$G_{rxm} = HU.$$

Constrained model editing provides the power to change the design globally, and consistently within the model space, with a few interactions by the designer. The effects of editing are not local to the feature being edited.

FIGS. 5 and 6 show how a designer might drag a "hard point" on a vehicle roof, while the vehicle changes continuously from a sedan to a truck. In this case, the matrix H is composed of zeros and ones, and selects the single feature being dragged. The vector $z_0$ is the desired, continuously changing value of the feature point while it is being dragged.

If the wheel centers are features in the design, then a different matrix H can calculate the difference of those features along the vehicle length axis, and $z_0$ can be designated by the designer as a desired wheelbase dimension—perhaps by entering it numerically.

The magnitude of the covariance (R) for v compared to the magnitude of the system covariance used by H determines how precisely the new value is adopted. In the case of moving a point, the designer may want to specify the location exactly (R→0). However, it is possible to let the design "pull back" and settle into a state that is influenced less strongly by the manipulation (in that case R is larger, allowing the dragged point position, for example, some variability in subsequent steps). When a range of values is permissible—e.g. a range of wheelbases—increasing the value of R allows the design to find an optimum balance of this and other constraints. As discussed above, this relative weighting may also be a designer-specified value, perhaps through a slider.

To recapitulate the update discussion in brief, in general, the covariance matrix may be ill-conditioned. A singular value decomposition (SVD) may be applied to obtain the principal components characterizing the mix of designs. The reduction to principal components may then allow the design space to be explored in a generally stable, computationally economical way.

The average array and covariance matrix completely characterize data, in the case where the data were drawn from an underlying Gaussian distribution. Linear constraints imposed on the data then result in different Gaussian distributions, as can be determined by evaluating the conditional probabilities for the data array elements in the presence of a linear constraint. Even in the case of non-linear constraints, however, this approach may be used to advantage in exploring the design space.

As discussed above, in the probability calculation from the populated design space, one gets an average or mean array and a covariance matrix. The user can choose to constrain the geometric shape delivered by the system and method, thereby obtaining a new geometric shape. The user may choose to continue to use the original, unconstrained covariance matrix. That is, when the method is implemented, the average array is updated, and not the covariance matrix. In this way, some information about the original mix of designs is still available to the designer for further use in exploring the design space.

In summary, and with all of the qualifications and those that may be inferred by the preceding disclosure incorporated herein, a segmentation tool method and system may be incorporated in or separate from the design tool apparatus and product. Adjustments to the methods described herein are within the scope of this disclosure so that the output results are substantially achieved accordingly. The output generated by the use of the general statistical and mathematical models described herein provides a substantial variety of derivable shapes defined in terms of continuously variable parameters.

Referring to FIGS. 15 to 19, it is further to be noted that the elements on the display are different sections of the design, and they may be accessed collaboratively. So one user may be running this on perhaps a wall display at one site, as shown at 500 in FIG. 15, another designer may be updating another part of the design on a tablet PC at a second site, and third user may be on a personal computer working remotely drawing the colors or doing different things; these activities may be done around the world. Collaborative tools sharing 3D models are contemplated by this disclosure. Multiple parties in different parts of the world can be sharing parts of the interface, in real time.

Figure 15:
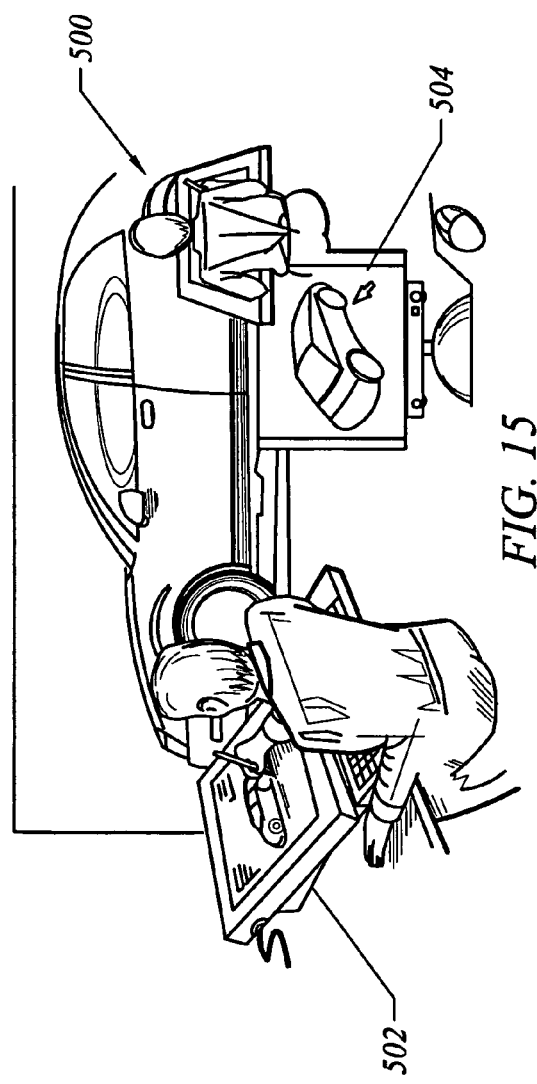
FIG. 15 is an illustration showing several user interfaces.
Figure 17:
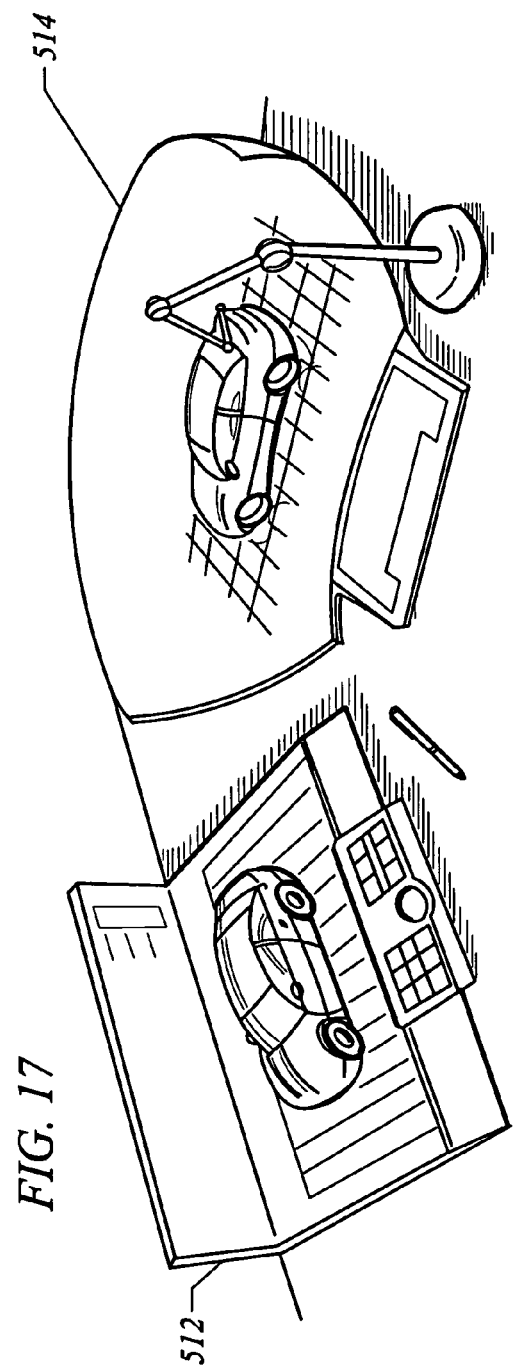
FIG. 17 is an illustration showing several user interfaces.

FIGS. 15-19 show various possible user interface configuration. Briefly referring to FIG. 3, it is within the scope of this disclosure that user 110 may be more than one user, and users may access the processor 104 through LAN or WAN so that users may access the processor 104 remotely. FIG. 15 shows an embodiment of a user interface providing for interactive sketching at 502, and a mouse and monitor for input at 504. FIG. 16 shows a collaborative full size display at 506, with an interactive plasma display at 508 and multi-collaborative workstations at 510. FIG. 17 shows an embodiment of a user interface providing for a cordless stylus and a 3D spaceball at 512, and another embodiment providing for a force feedback stereoscopic display at 514. FIG. 18 shows an embodiment including a workbench display at 516, and a 3D interactive interface at 518. FIG. 19 shows an embodiment including a walk-up kiosk at 520.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for designing, on a display device, a geometric shape, comprising the steps of:
    on a display device, displaying an initial set of similarly structured model exemplars, each exemplar including a first portion and a second portion;
    selecting a plurality of the model exemplars from the initial set of similarly structured model exemplars to apply to a model mix;
    mixing the plurality of selected model exemplars to form a morphable model whose shape is defined by an average of the shapes of the selected model exemplars, said morphable model including a first portion and a second portion;
    on the display device, providing a plurality of selectable feature for manipulating the second portion of the morphable model, wherein a user can select a particular selectable feature to manipulate only that feature of the morphable model by moving a pointer on the feature on the display, and wherein selecting the particular selectable feature causes the display to display a cluster of points on the morphable model that define a space of the selected feature that includes the position of the selected feature for all of the exemplars in the model mix; and applying at least one constraint of the selected selectable feature to the morphable model to update both the first portion and the second portion of the morphable model into a new geometric shape design.

2. A method as in claim 1 wherein the morphable model continuously morphs into the new geometric shape design as the constraint is applied.

3. A method as in claim 1 wherein the initial set of model exemplars have elements in 1-to-1 correspondence.

4. A method as in claim 1 wherein the plurality of selected model exemplars and the morphable model or the new geometric shape design model may be displayed on the display device so that they are transparently superimposed upon one another.

5. A method as in claim 1 wherein the first portion is that of a human representation and the second portion is that of an automobile.

6. A method as in claim 1 wherein the selectable feature is a point on the morphable model.

7. An exemplar design selection system, comprising:
a computing device having a memory;
a display device operatively connected to the computing device;
a selection device operatively connected to the computing device;
a user interface configured for use with the display device and the selection device;
a datastore of exemplar designs, each exemplar design including a first portion and a second portion, the datastore being stored in the memory;
a design space creation module operatively connected to the computing device configured to create a design space from a set of selected exemplar designs including a first portion and a second portion wherein the user interface allows the selection of a plurality of exemplar designs for processing by the design space module to generate a morphable statistical model, wherein the plurality of selected exemplar designs are mixed to form the statistical model whose shape is defined by an average of the shapes of the selected exemplar designs; and
an update module operatively connected to the computing device including instructions for applying at least one constraint to at least one selectable feature of the second portion of the exemplar design for updating both the first portion and the second portion and generating a new model from the statistical model, wherein a user can select a particular selectable feature to manipulate only that feature of the statistical model by moving a pointer on the feature on the display device, and wherein the particular selectable feature causes the display device to display a cluster of points on the statistical model that define a space of the selected feature that includes the position of the selected feature for all of the exemplar designs.

8. A system as recited in claim 7 wherein the first portions of the exemplar designs are human representations and wherein the second portions of the exemplar designs are vehicle designs.

9. A system as recited in claim 7 wherein the design space module includes instructions to process the exemplar designs so that their statistics are generated to form a statistical model.

10. A system as recited in claim 9 wherein the statistical model is displayed on the display device by displaying an average model.

11. A system as recited in claim 10 wherein the plurality of exemplar designs and the statistical model are displayed simultaneously on the display device.

12. A system as recited in claim 7 wherein the selectable feature is a point on the statistical model.

13. A system as recited in claim 7 wherein the user interface includes a plurality of separate user stations operatively connected for use by a plurality of users.

14. A product for designing complex geometric shapes, comprising:
a tangible media for storing instructions capable of being executed by a computer;
means for storing in a memory a datastore of exemplar designs each having a first portion and a second portion;
means for processing a set of selected exemplar designs including the first portions and the second portions;
means for creating a design space from a plurality of selected exemplar designs;
means for mixing the plurality of selected exemplar designs to form a statistical model whose shape is defined by an average of the plurality of shapes of the selected exemplar designs; and
means for applying one or more constraints to a selectable feature of the first portion of the statistical model to form a morphed geometric shape design of the first portion and the second portion, wherein a user can select a particular selectable feature to manipulate only that feature of the statistical model by moving a pointer on the feature, and wherein selecting the particular selectable feature causes a display to display a cluster of points on the statistical model that define a space of the selected feature that includes the position of the selected feature for all of the exemplar designs.

15. A product as recited in claim 14 further comprising:
means for displaying on a display device, the plurality of selected exemplar designs and the statistical model superimposed upon one another.

16. A product as recited in claim 14 further comprising:
means for displaying on a display device, at least one selectable feature for manipulating the statistical model.

17. A product as recited in claim 14 wherein the statistical model is an average model.

18. A product as in claim 14, further comprising:
means for morphing the model according to user input.

19. A product as recited in claim 14 wherein the first portion of the exemplar designs are human representations and the second portions of the exemplar designs are vehicle designs.

* * * * *